US006067088A

United States Patent [19]

Tanioka et al.

[11] Patent Number: 6,067,088

[45] **Date of Patent: *May 23, 2000**

[54] IMAGE PROCESSING METHOD AND APPARATUS THEREOF

[75] Inventors: Hiroshi Tanioka, Yokohama; Yoshinobu Umeda, Tokyo, both of Japan

[73] Assignee: Canon Kabushiki Kaisha, Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/649,470

[22] Filed: May 17, 1996

[30] Foreign Application Priority Data

| | | | |
|---|---|---|---|
| May 31, 1995 | [JP] | Japan | 7-133735 |
| May 18, 1995 | [JP] | Japan | 7-119840 |
| Oct. 18, 1995 | [JP] | Japan | 7-269823 |

[51] Int. Cl.[7] .......... G06T 5/00

[52] U.S. Cl. .......... 345/428

[58] Field of Search .......... 395/128–133; 345/428–433

[56] References Cited

U.S. PATENT DOCUMENTS

| | | | |
|---|---|---|---|
| 4,729,035 | 3/1988 | Tanioka | 358/282 |
| 4,821,334 | 4/1989 | Ogino et al. | 382/50 |
| 5,121,446 | 6/1992 | Yamada et al. | 382/50 |
| 5,121,447 | 6/1992 | Tanioka et al. | 382/50 |
| 5,153,925 | 10/1992 | Tanioka et al. | 382/52 |
| 5,184,317 | 2/1993 | Pickett | 364/735 |
| 5,333,263 | 7/1994 | Masaki et al. | 395/164 |
| 5,384,912 | 1/1995 | Ogrinc et al. | 395/164 |

FOREIGN PATENT DOCUMENTS

| | | | |
|---|---|---|---|
| 0118053 | 9/1984 | European Pat. Off. | G06F 15/20 |
| 0441121 | 8/1991 | European Pat. Off. | G06F 1/035 |

OTHER PUBLICATIONS

"An Image Signal Multiprocessor On A Single Chip," Masakatsu Maruyam, et al., IEEE Journal of Solid–State Circuits, vol. 25, No. 6, Dec. 1, 1990, pp. 1476–1483, XP000176578.

*Primary Examiner*—Almis R. Jankus
*Attorney, Agent, or Firm*—Fitzpatrick, Cella, Harper & Scinto

[57] ABSTRACT

An image processor which processes an image signal using a DSP (digital signal processor), wherein a shading correction process, a logarithmic transformation process, an edge emphasizing process, a density adjustment process and a binarization process of the like are performed utilizing the DSP and a look-up table outside the DSP. An image signal is input in an order of raster scanning, and each pixel data of the image signal is set to an input register of the DSP. Calculations necessary for shading correction are performed in parallel on the pixel data by a plurality of ALUs in the DSP, and a logarithmic transformation is performed on the calculation results utilizing the look-up table. Further, the logarithmically-transformed signal is input to the DSP and set to the input register for an edge emphasizing process which is performed by the plurality of ALUs. The result is again input to the look-up table for a density adjustment process and input to the DSP for binarization and subsequent output.

50 Claims, 20 Drawing Sheets

FIG. 8

| | |
|---|---|
| RF01 | WHITE DATA (W) |
| RF02 | BLACK DATA (B) |
| RF03 | INPUT SIGNAL (A) |
| RF04 | LOGARITHMICALLY-TRANSFORMED SIGNAL (D(0, N)) |
| RF05 | LOGARITHMICALLY-TRANSFORMED SIGNAL (D(1, N)) |
| RF06 | LOGARITHMICALLY-TRANSFORMED SIGNAL (D(2, N)) |
| RF07 | DENSITY-ADJUSTED SIGNAL (F) |
| RF08 | THRESHOLD VALUE (T1) FOR DITHER |
| RF09 | THRESHOLD VALUE (T2) FOR DITHER |
| RF0A | THRESHOLD VALUE (T3) FOR DITHER |
| RF0B | THRESHOLD VALUE (T4) FOR DITHER |
| RF0C | |

FIG. 9

| | |
|---|---|
| RF11 | SHADING-CORRECTED SIGNAL (S) |
| RF12 | EDGE EMPHASIZED SIGNAL (E) |
| RF13 | BINARIZED SIGNAL (O) |
| | |

FIG. 10

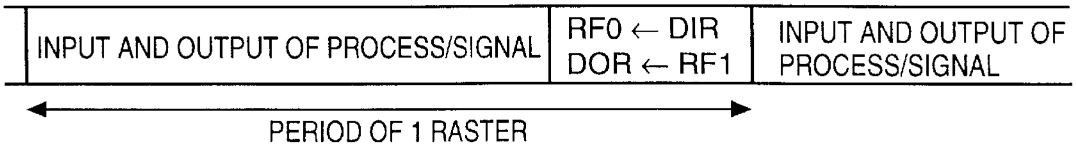

IN CASE OF A1

IN CASE OF A2

FIG. 21

| | X-TH PE | (X+1)TH PE | (X+2)TH PE | | | | | (X+9)TH PE |
|---|---|---|---|---|---|---|---|---|
| ADDRESS 9 | S(x-9,9) | S(x-8,9) | S(x-7,9) | | | | | S(x,9) |
| ADDRESS 8 | S(x-8,8) | S(x-7,8) | S(x-6,8) | | | | | S(x+1,8) |
| ADDRESS 7 | S(x-7,7) | S(x-6,7) | S(x-5,7) | | | | | S(x+2,7) |
| ADDRESS 6 | S(x-6,6) | S(x-5,6) | S(x-4,6) | | | | | S(x+3,6) |
| ADDRESS 5 | S(x-5,5) | S(x-4,5) | S(x-3,5) | | | | | S(x+4,5) |
| ADDRESS 4 | S(x-4,4) | S(x-3,4) | S(x-2,4) | | | | | S(x+5,4) |
| ADDRESS 3 | S(x-3,3) | S(x-2,3) | S(x-1,3) | | | | | S(x+6,3) |
| ADDRESS 2 | S(x-2,2) | S(x-1,2) | S(x,2) | | | | | S(x+7,2) |
| ADDRESS 1 | S(x-1,1) | S(x,1) | S(x+1,1) | | | | | S(x+8,1) |
| ADDRESS 0 | S(x,0) | S(x+1,0) | S(x+2,0) | | | | | S(x+9,0) |

IMAGE PROCESSING METHOD AND APPARATUS THEREOF

BACKGROUND OF THE INVENTION

1. Field of the Invention

The present invention relates to an image processing method and apparatus for inputting an image signal, processing the inputted image signal and outputting the result.

2. Descriptions of the Related Art

In an image processing apparatus, an original image is read by an image sensor such as a CCD and an obtained luminance signal is logarithmically transformed to generate a density signal proportional to a recorded density. Herein, since the luminance signal obtained from the sensor is a raster signal of every line, a LUT (look-up table) conversion is performed utilizing a memory of 256 words having eight address terminals, for a logarithmic transformation of an image signal with one pixel having 8 bits. A non-linear data conversion of this type is not limited to a logarithmic transformation, and other various conversions such as a γ-conversion for density adjustment, a conversion for correcting recording unevenness of solid recording elements or the like are known.

Further, an edge emphasizing process or a smoothing process are performed on the image signal. Still further, a calculation such as multiplying of the image data by matrix data representative of a two-dimensional space filter is performed for a pattern recognition process or the like for recognizing the image. The calculation is complicated and must be executed every time one pixel is read; therefore, it is necessary to two-dimensionally store all the read image signals in a predetermined area and execute multiplication and summing on the stored two-dimensional image signals.

Recently, a DSP (digital signal processor), developed for the purpose of an image processing, which comprises a number of arithmetic logic units (ALUs) for a real-time process of high-speed video signals such as an NTSC signal, makes it possible to process pixel data of one raster in parallel at each processor.

Generally, the above described image processing is performed utilizing a look-up table (LUT). Such image processing where image data is converted by the LUT has an advantage that the process can be serially executed with a single LUT without considering the number of pixels in one raster. However, in order to perform this type of image processing utilizing the above described DSP which enables parallel processing, a memory for the LUT is necessary having as many storage locations as the numbers of bits compressing the pixels; therefore, the size of the LUT becomes extremely large, thereby making it difficult to realize.

Taking a DSP (SVP: scan-line video processor) made by Texas Instrument, Inc. as an example, the bit numbers of each register simultaneously-usable for calculating each pixel data is 256 bit. Therefore, if the foregoing LUT conversion is to be performed, the capacity of a register must be ten times larger than the one currently used.

Further in the above-described multiplication and summing calculation, if an image processing area for the image data is extended, the circuit structure becomes large and expensive; therefore, an inexpensive circuit structure cannot be achieved. Even if a circuit utilizing the above described DSP is utilized, the image data area subjected to be processed is limited by the DSP specification. Further, even if an image processing in a wide area is possible, the processing by the DSP cannot be completed within a predetermined time.

SUMMARY OF THE INVENTION

The present invention has been made in consideration of the above situation, and has as its object to provide an image processing method and apparatus thereof for performing an image processing utilizing a DSP which is capable of parallel processing.

Another object is to provide an image processing method and apparatus thereof for performing fast image processing utilizing the conventional DSP, by parallelly calculating a pixel signal and a constant portion applying an approximated polynomial for the image processing, and extracting necessary data from the calculation result by executing the polynomial.

Another object of the present invention is to provide an image processing method and apparatus thereof for realizing an image processing suitable for the conventional serial process by utilizing a DSP capable of parallel-processing.

Another object of the present invention is to provide an image processing method and apparatus thereof for an image processing with high-speed and low cost, conventionally performed in series with an ASIC or the like, by having a plural sets of arithmetic logic units in one chip, performing a LUT conversion on an output signal of the DSP where serially inputted data is stored parallelly and processed in parallel, and inputting the LUT-converted signal to the DSP again for further processing.

Another object of the present invention is to provide an image processing method and apparatus thereof for executing shading correction, logarithmic transformation, edge emphasizing, density adjustment, binarization and the like, which have conventionally been performed serially, by a plurality of units utilizing the DSP and the look-up table.

Another object of the present invention is to provide an image processing process and apparatus thereof for performing a fast calculation on two-dimensional image data and a two-dimensional calculation coefficient comprising a plurality of calculation units and operating these calculation units in parallel.

Another object of the present invention is to provide an image processing method and apparatus thereof which enables image processing with reduced calculation time by applying calculation results calculated by the plurality of calculation units to other calculation units.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 8 is a diagram showing contents of a register RF0 according to the second embodiment;

FIG. 9 is a diagram showing contents of a register RF1 according to the second embodiment;

FIG. 10 is a diagram illustrating timing of signal input/output according to the second embodiment;

FIG. 21 is a table showing an arrangement of the element data calculated by each processor element of the DSP according to the fourth embodiment;

DETAILED DESCRIPTION OF THE PREFERRED EMBODIMENT(S)

Preferred embodiment(s) of the present invention will be described in detail in accordance with the accompanying drawings.

Figure 1:
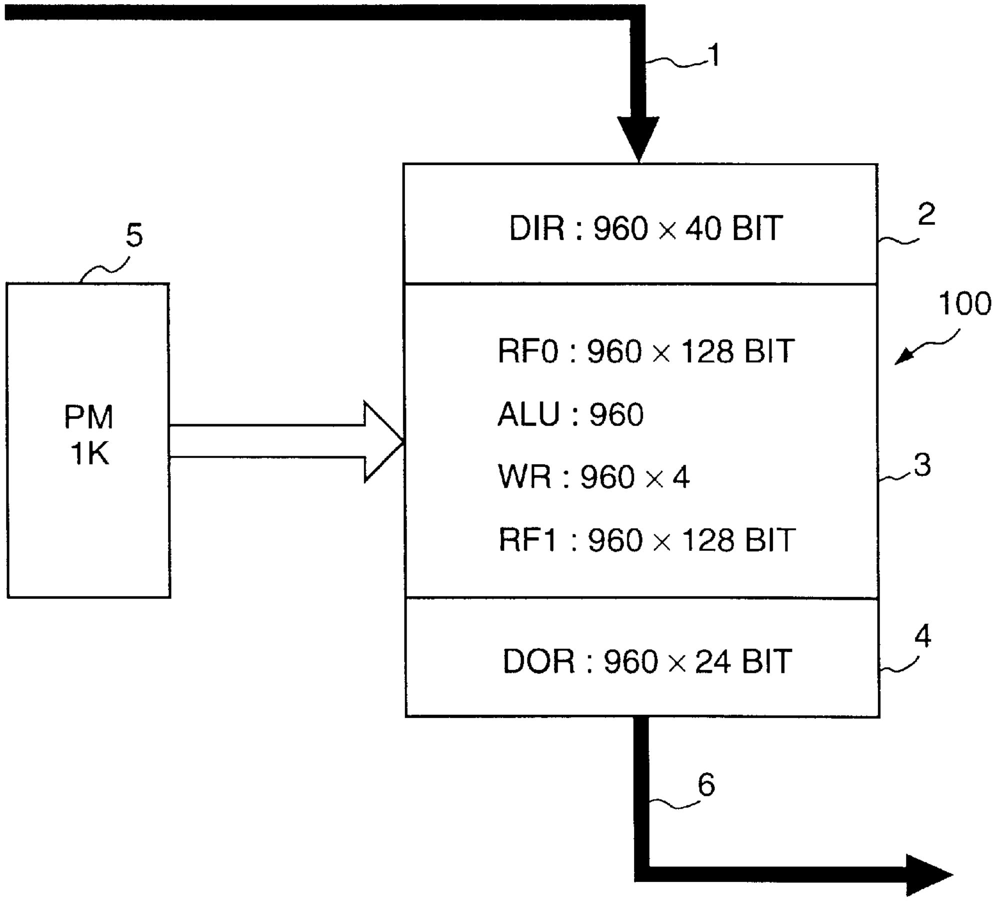
FIG. 1 is a block diagram of a DSP 100 (scanner-line video processor (SVP) made by Texas Instrument, Inc.) utilized in present embodiments.

FIG. 1 is a block diagram of a DSP 100 (a scanner-line video processor (SVP) made by Texas Instrument, Inc.) according to the present embodiment.

In the DSP 100, a raster image signal with a maximum width of 40 bits is inputted from an input bus 1 and stored in a data-input register (DIR) 2. The data-input register 2 is capable of storing image signals for 960 pixels (40×960 bits) and parallelly outputting the image signals for 960 pixels to a processor 3. The processor 3 is composed of 960 sets of processor elements each of which has two register files with 128 bits: RF0 and RF1, four working registers (WR) and 960 units of arithmetic logic units (ALU). All of the ALUs process the inputted image signal in parallel according to a program prepared in a single program memory unit (PM) 5. Note that in the SVP 100, the n-th PE can access to registers processed by adjoining four PEs (the (n−2)th PE to the (n+2)th PE) of the n-th PE. A result processed in the foregoing manner is transferred to a data output register DOR 4 having a 24-bit width, then performed a parallel-to-serial conversion and outputted via an output data bus 6.

<First Embodiment>

Figure 2:
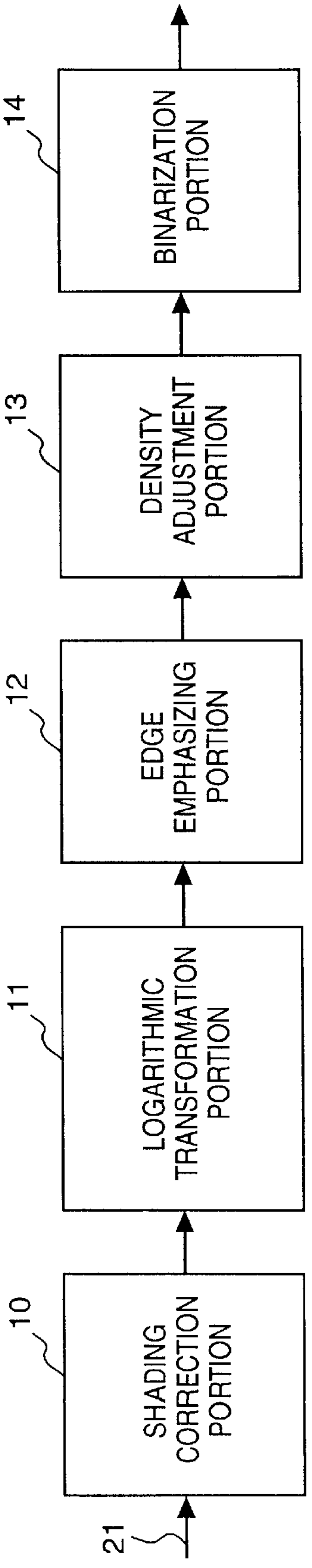
FIG. 2 is a block diagram explaining a series of image processing according to the present embodiments.

FIG. 2 is a block diagram explaining a series of image processing according to a first embodiment of the present invention.

An image signal 21, read by a reading sensor such as an image scanner, is corrected for color unevenness at a shading correction portion 10 based upon a white signal read as a reference from a white plate. Then, a LOG transformation is performed at a logarithmic transformation portion 11 for converting a luminance signal to a density signal. At an edge emphasizing portion 12, edges are emphasized for clear reproduction of the image. After density is adjusted by a density adjusting lever at a density adjusting portion 13, the image signal is binarized by a method of organizational dither at a binarization circuit 14 and outputted to a recording apparatus to be recorded.

In the first embodiment, non-linear data transformation at the logarithmic transformation portion 11 and the density adjusting portion 13 is performed employing a polynomial approximation. Note that an example is given using an ink-jet recording with one raster including 512 pixels (a serial-type inkjet printer apparatus having 512 nozzles of inkjet heads) in the first embodiment.

Generally, in the logarithmic transformation process, a luminance signal F (8 bits: 0 to 255) can be transformed into a density signal D (8 bits) by the following equation (1).

$$D=-K\times Log\ (F/255)\ \text{(K is a constant)} \tag{1}$$

The equation (1) can be approximated by the following polynomial.

$$\begin{aligned} D \to & K0+K1\times F+K2\times F\times F+K3\times F\times F\times F+ \\ & K4\times F\times F\times F\times F+K5\times F\times F\times F\times F\times F+\ldots = \\ & K0+K1\times F+K2\times F\times F+K3\times F1\times F+ \\ & K4\times F2\times F+K5\times F3\times F+\ldots \end{aligned} \tag{2}$$

Herein, F1=F×F, F2=F1×F, F3=F2×F are satisfied; and K0, K1, K2, k3, K4 and K5 are constants.

In the equation (2), if a polynomial approximation is to be calculated up to the N-degree, the number of times for multiplication is (1+2+3+4+ . . . +N) times; accordingly, adding is required for (N+1) times.

On the other hand, if a calculation for power of F is only consecutively performed on the input signal F, and multiplication and summing are repeated utilizing necessary values from the obtained values ($F^n$s) of the power of F, the number of times for multiplication is [1+2×(N−1)], which is much less than the conventional calculation. For instance, if N=15, the number of times for multiplication can be reduced from 120 times (=1+2+3 . . . +15) to 29 times (1+2×14).

Further, all the signal area of the input signal F need not be approximated with one type of polynomial; instead, for instance, the signal area can be divided into three area where each of the area is approximated with an individual polynomial, and the equation (used polynomial) can be switched depending on the value of the input signal F. This way, even if a calculation with five-degree terms is executed, a logarithmic transformation can be performed with almost no error. Note that descriptions are given only on the logarithmic transformation in the first embodiment; however, general non-linear data transformations such as shading correction, edge emphasizing, density adjustment, and binarization shown in FIG. 2 can be similarly performed.

Figure 3:
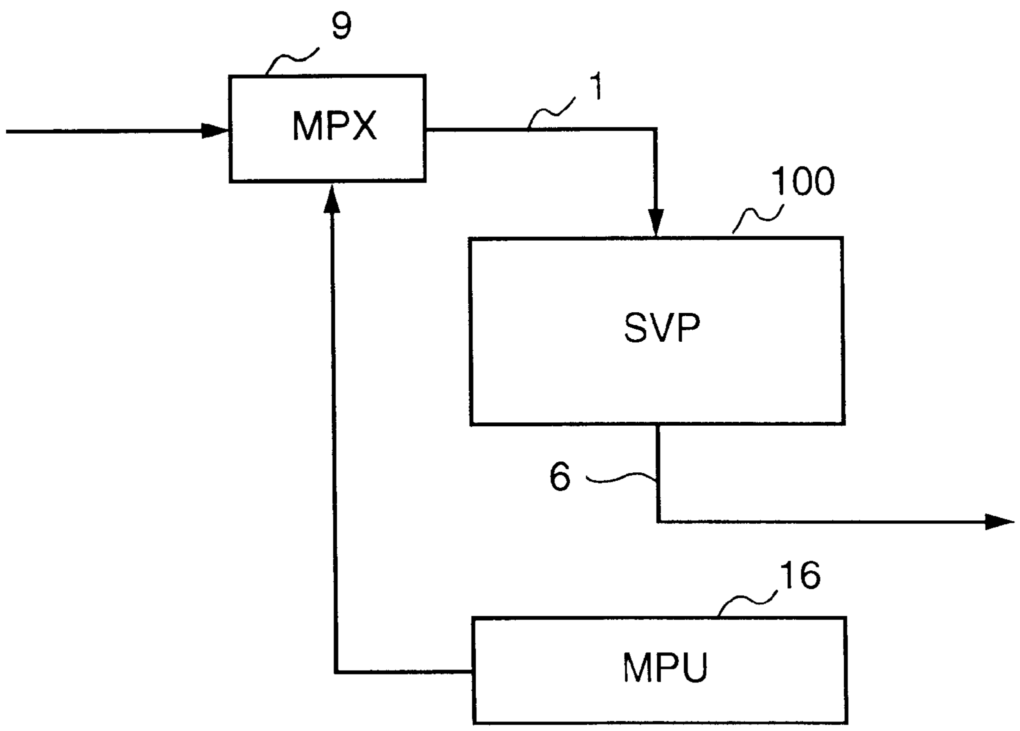
FIG. 3 is a block diagram showing a hardware structure of an image processing circuit according to a first embodiment of the present invention.

FIG. 3 is a block diagram showing a hardware structure of a logarithmic transformation circuit according to the first embodiment of the present invention.

In FIG. 3, a multi-plexer (MPX) 9 switches from data inputting of an MPU 16 to a raster image signal and inputs data to the SVP 100. All the above-described process is processed in the SVP 100 and a binarized result is outputted from the output data bus 6. The role of the MPU 16 is to switch the MPX 9 for inputting image data from the MPU 16 to the SVP 100 and set constants, and control loading of a program as well as timing for the SVP 100.

Figure 4:
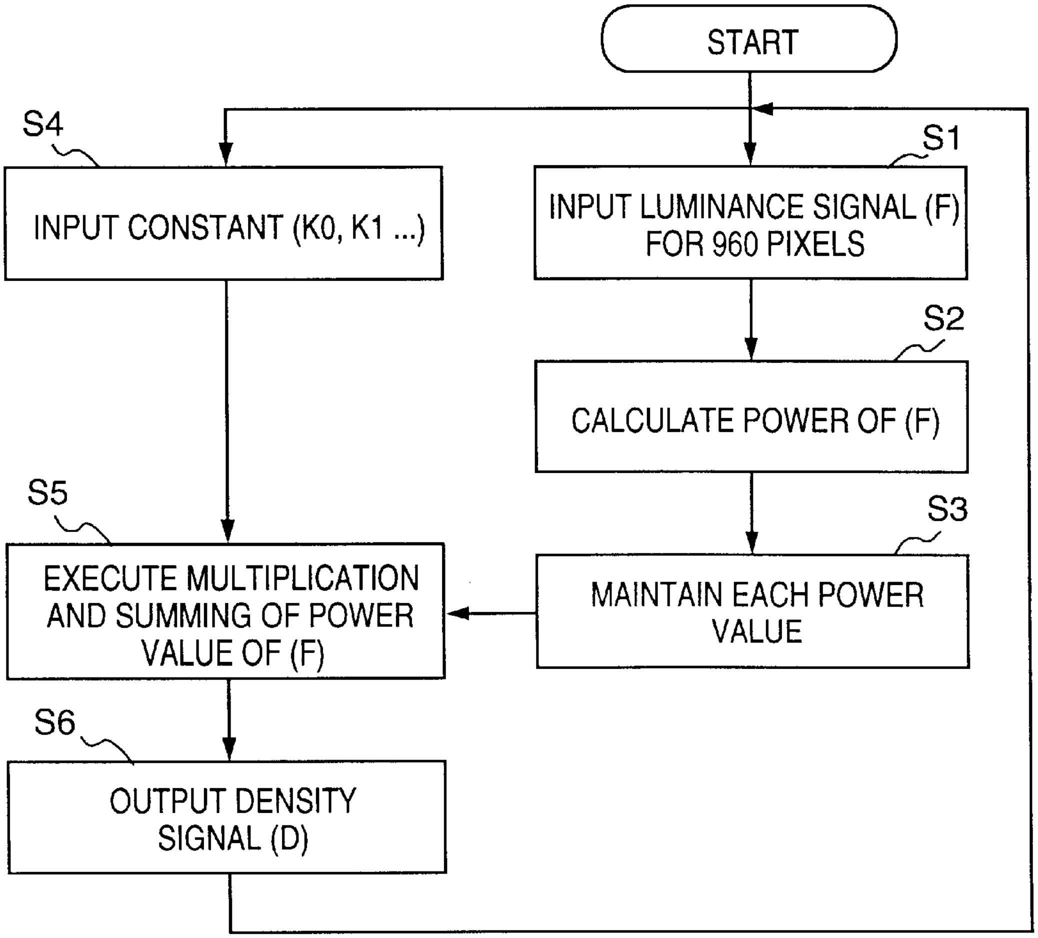
FIG. 4 is a flowchart showing a flow of a process in the SVP according to the first embodiment of the present invention.

FIG. 4 is a flowchart for explaining the logarithmic transformation process at the SVP 100 according to the first embodiment. For the purpose of explanation, the flowchart describes a flow of the processes executed in parallel, and not necessarily describes a sequence of actual operations.

The MPU 16 manages data to be inputted to the SVP 100. A pixel signal (luminance signal F) for 960 pixels corrected at the shading correction portion 10 is parallelly inputted in step S1. When the pixel signal is inputted, a power value (F1, F2, F3) of the luminance signal for the pixels is calculated in step 2, and the calculation result is stored in the register RF0 or the RF1.

In parallel with the above process, constants K0, K1, K2 . . . is inputted respectively from the MPU 16 via the MPX 9 in step 4, each of the constants is multiplied with the power value of F (F1, F2, F3 . . . ) stored in the register RF0 or the RF1 in step S3, and the result is summed according to the equation (2). The density signal D is obtained in the foregoing manner, then the result is set at the output register DOR 4, and outputted via the output data bus 6.

As set forth above, according to the first embodiment, non-linear data conversion conventionally performed by the LUT conversion method utilizing a memory, can be performed by a processor capable of parallelly processing one raster of an image, with high speed, high precision and at low cost.

[Second Embodiment]

Next, a second embodiment according to the present invention will be described. Note that the SVP 100 utilized in the second embodiment is identical to the one described with reference to FIG. 1; and the process for image processing is identical to the one described with reference to FIG. 2; accordingly, their explanations will be omitted. However differences should be noted in the second embodiment that processes of the shading correction portion 10, the edge emphasizing portion 12 and the binarization circuit 14 are performed by the SVP 100 shown in FIG. 1; and the processes of the logarithmic transformation portion 11 and the density adjustment portion 13 are performed by the LUT transformation utilizing an external memory as conventionally performed. Descriptions are given based upon an ink-jet recording with one raster including 512 pixels in the second embodiment.

Figure 5:
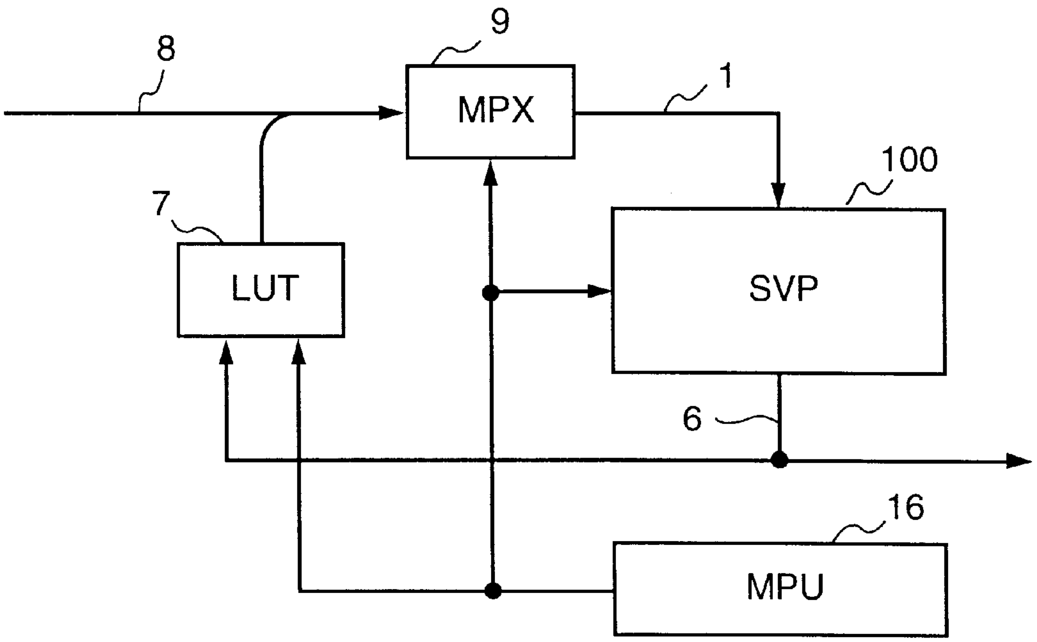
FIG. 5 is a block diagram showing a hardware structure of an image processing circuit according to a second embodiment of the present invention.

FIG. 5 is a block diagram showing a hardware structure of a circuit according to the second embodiment of the present invention.

The SVP 100 first performs a shading correction on an input signal 1 (A) inputted via the MPX 9 and outputs to the output data bus 6. A LUT 7 comprises two RAMs each of which has 256 bytes, and one of the RAMs performs a logarithmic transformation on the data from the output bus 6 and inputs back to the SVP 100 via the LUT 7. The SVP 100 stores the logarithmic-transformed signal D (0, N) for three lines, performs an edge emphasizing process for the area of 3×3 pixels and outputs to the output bus 6. Data conversion is performed on the edge-emphasized signal E for density adjustment utilizing the other RAM in the LUT 7 and inputted back to the SVP 100 as similar to the foregoing process. The SVP 100 performs a binarization process on the density-adjusted signal F and outputs the binarized data to the output bus 6 as a processed result.

In the foregoing process, one byte in the input bus 1 (5 bytes) of the SVP 100 is allocated for the input signal A, another one byte is allocated for the logarithmic-transformed signal D (0, N) which is obtained by performing logarithmic transformation on a prior raster line of the input signal A, and another one byte is allocated for the density-adjusted signal F which is obtained by performing density adjustment on two-raster prior lines of the input signal A. The SVP 100 simultaneously inputs signals of three byte via the input bus 1 in the above manner and performs any of a shading process, an edge emphasizing process, or a binarization process on each signal. Further, one byte in the output bus 6 of the SVP 100 is allocated to a signal S which has been shading-corrected, other one byte to the edge-emphasized signal E, and one bit to a binarized signal O; and these signals are simultaneously outputted to the output bus 6.

Data conversion is individually executed on each of the shading-corrected signal S and the edge-emphasized signal E at the LUT 7 for a logarithmic transformation and density adjustment respectively. Meanwhile, the binarized signal O is a binarization result of a signal three-lines prior to the current input signal A. Processes are performed in parallel on all the 512 pixels by an internal processor of the SVP 100.

Note that the MPU 16 performs writing and reading of data to the LUT 7, MPX 9, and SVP 100.

The process performed by the SVP 100 will be described next with reference to the memory map of the internal registers of the SVP 100: DIR, DOR, RF0 and RF1 shown in FIGS. 6–9.

Figure 6:
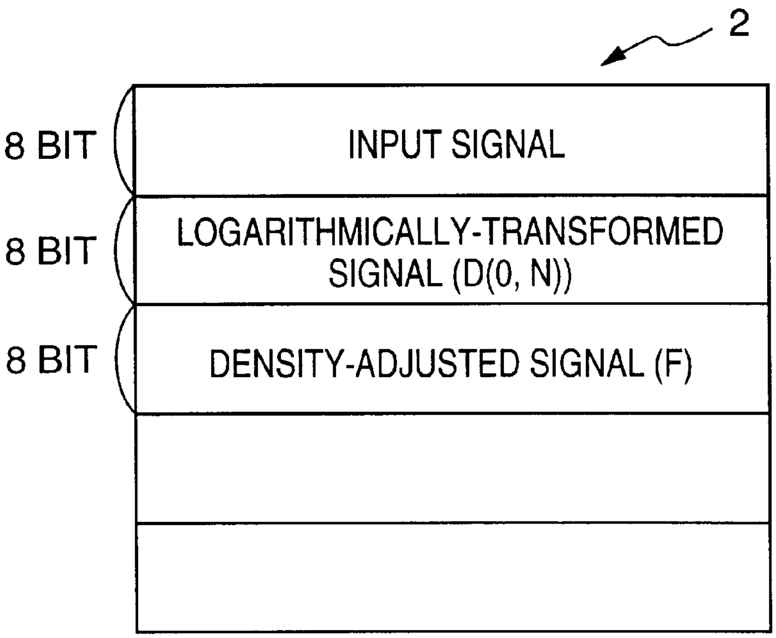
FIG. 6 is a diagram showing data contents of a data input register (DIR) according to the second embodiment.

FIG. 6 shows that the above described input signal A, logarithmic-transformed signal D (0, N), and density-adjusted signal F are respectively allocated to three bytes of the DIR 2. After data for one raster (512 pixels) is inputted, the input signal A is transferred to an RF03 of the RF0, the logarithmic-transformed signal D (0, N) to an RF04, and the density-adjusted signal F to an RF07 as shown in FIG. 8.

<Shading Correction>

As shown in FIG. 8, white data W in each pixel obtained by reading the white plate as a reference and black data B obtained by turning off the light source for exposing an original image are stored in each of an RF01 and an RF02 of the register RF0.

The shading-corrected signal S is obtained by performing the following calculation on the input signal A.

$$S=255\times A/(W-B)$$

The shading-corrected signal S obtained by the above calculation is stored in an RF11 of the register RF1 shown in FIG. 9.

<Edge Emphasizing>

When a logarithmic-transformed signal D (0, N) is inputted to the RF04, a logarithmic-transformed signal D (1, N)

of a prior raster line and a logarithmic-transformed signal D (2, N) of a two-raster prior line have already been stored in an RF05 and an RF06 of the register RF0. An edge emphasizing signal E is obtained with the following calculation utilizing the logarithmic-transformed signals for the above described three lines.

$$LP=4\times D(1,N)-D(0,N-1)-D(0,N+1)-D(2,N-1)-D(2,N+1)$$

wherein, if $-K1<LP<K1$ holds, LP=0

$$E=D(1,N)+K2\times LP$$

wherein, if $E<0$ holds, E=0 if $E>255$ holds, E=255

Herein, each of D(0, N−1) and D(2, N−1) represents data in the RF04 and RF06 which are processed by the parallelly corresponding ALUs in the processor 3, and the K1 and K2 are constants previously set by the MPU 16. The edge emphasizing signal E obtained in the foregoing manner is stored in an RF12 of the register RF1 as a signal emphasizing D(1, N). Then, data {D(1, N)} in the RF05 is copied to the RF06, similarly the data {D(0, N)} of the RF04 is copied to the RF05 for a process at a next line.

<Binarization>

A binarization process according to the second embodiment is performed by a dither method with 4×4 pixels as a basic dither matrix. Descriptions of binarization by an organization dither method is given hereinafter.

As shown in FIG. 8, threshold values T1, T2, T3 and T4 each having 4 bytes are respectively stored in RF08, RF09, RF0A and RF0B of the register RF0. The density-adjusted signal F is binarized with the threshold value (T).

Herein, a binarization signal O satisfies the followings:

if F>T holds, O=1 other O=0

The threshold value T is selected in the order of T1, T2, T3, T4, T1, T2 . . . , according to a value of a line counter (not shown). Then the binarized signal O is stored in an RF13 of the register RF1 (FIG. 9).

Figure 7:
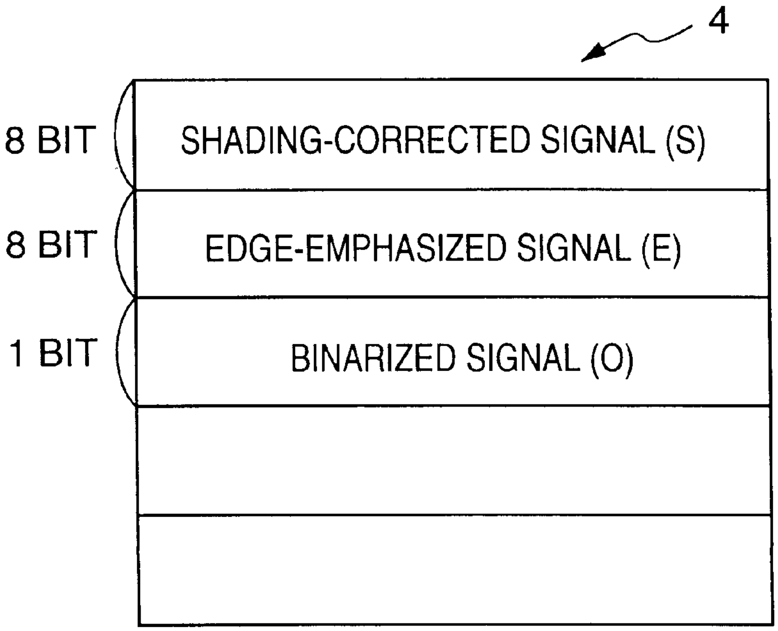
FIG. 7 is a diagram showing contents of data output register (DOR) according to the second embodiment.

When the foregoing series of processes is completed and the next raster data is inputted, the shading-corrected signal S, edge-emphasized signal E, binarized signal O stored respectively in the RF11, RF12 and RF13 are transferred to the DOR 4 as shown in FIG. 7. Note that the data in the register DOR 4 is serially outputted in synchronism with the beginning of inputting of the next data as illustrated in FIG. 10. An image processing for one page is completed by repeating the above described process for one page in synchronism with a raster signal.

Figure 11:
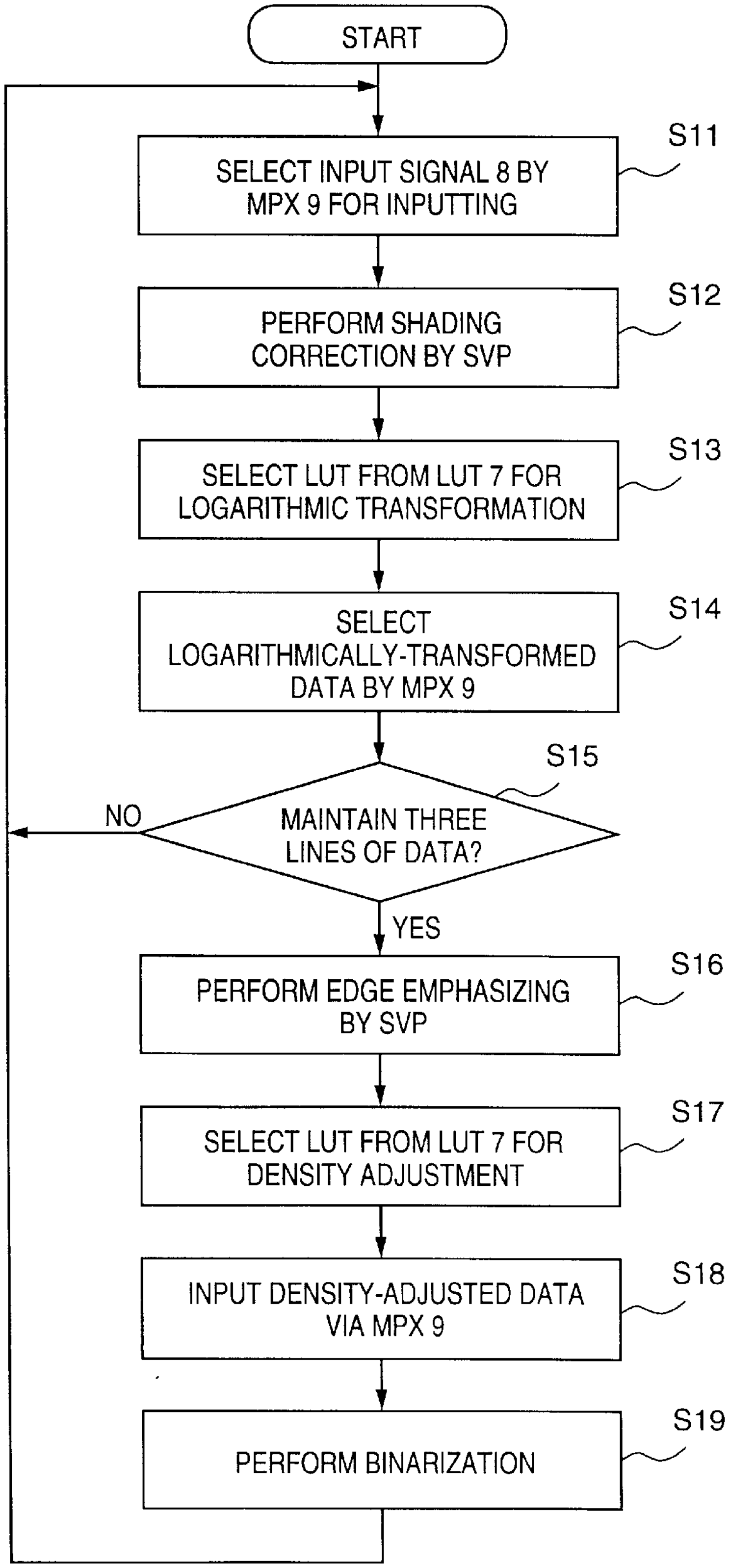
FIG. 11 is a flowchart showing operations executed by the circuit shown in FIG. 5.

FIG. 11 is a flowchart showing a process according to the second embodiment.

The MPU 16 first sets the MPX 9 to select the input signal 8 (A). A shading correction is performed on the input signal A by the SVP 100 and the result thereof is outputted from the DOR 4 to the output bus 6 (S12). In the next step S13, the MPU 16 selects a table for performing a logarithmic transformation from the LUT 7. In step S14, the MPX 9 selects the output from the LUT 7 and the logarithmic-transformed data is inputted back to the SVP 100 via the MPX 9.

As set forth above, since the SVP 100 is structured to maintain the logarithmic-transformed data D (0, N) for three lines, if data for three lines is maintained, the process proceeds from step S15 to step S16, where an edge emphasizing process is performed in the 3×3 pixel area, and then the data is outputted to the output bus 6. In step S17, the MPX 9 selects the other table of the LUT 7 and data conversion for density adjustment is performed on the edge-emphasized signal E. Then, the process proceeds to step S18 where an output of the LUT 7 is selected by the MPX 9 and inputted back to the SVP 100, similar to the above described step. Accordingly, in step S19, the SVP 100 performs a binarization process on the density-adjusted signal F and the binarized data is outputted to the output bus 6 as a final process result.

<Third Embodiment>

In the second embodiment, various processes as well as inputting and outputting at the SVP 100 are performed in synchronism with an input signal for one raster, as shown in FIG. 10. In the following third embodiment, a period of the input signal for one raster will be divided into six periods and a process is performed individually at each period.

Figure 12:
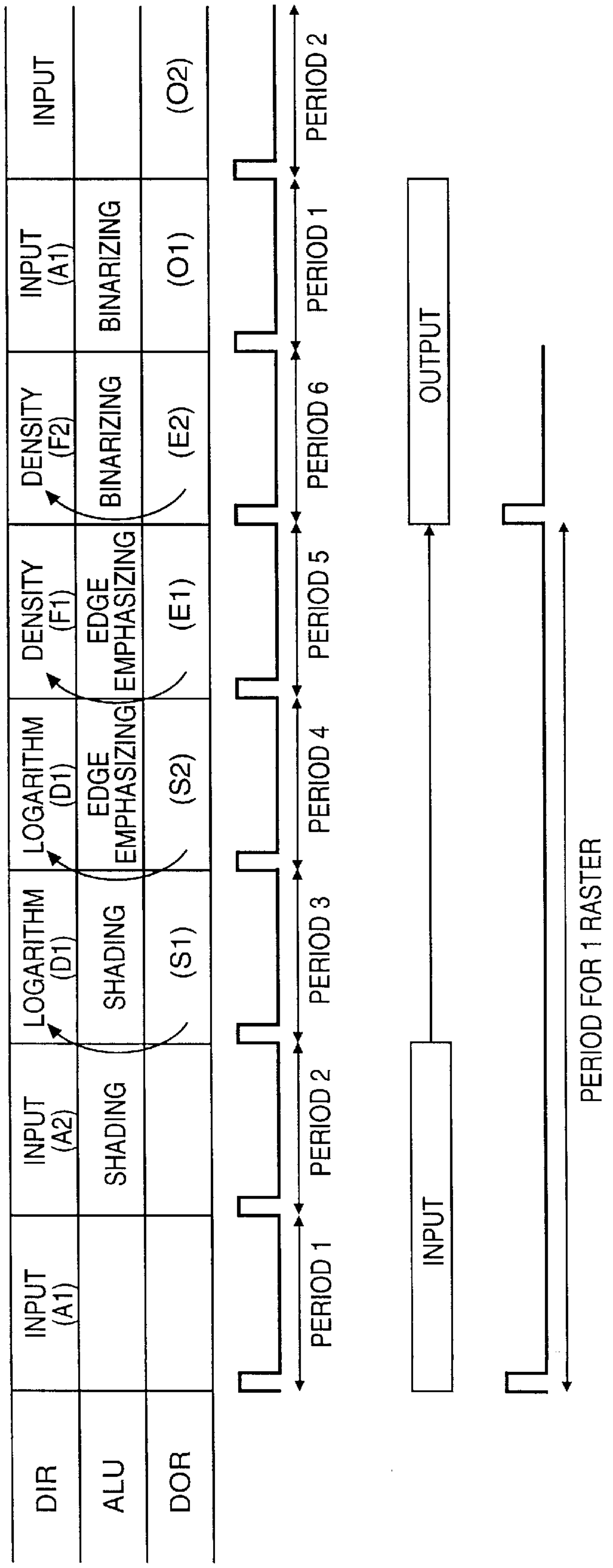
FIG. 12 is a diagram illustrating timing of signal processing according to a third embodiment of the present invention.

FIG. 12 is a diagram illustrating timing of the signal processing.

An input signal of one raster is first divided into two (A1, A2) parts, velocity of the input signal is converted by a FIFO or the like, and the data is inputted to the SVP 100 within one third the period of the one raster.

Figure 13A:
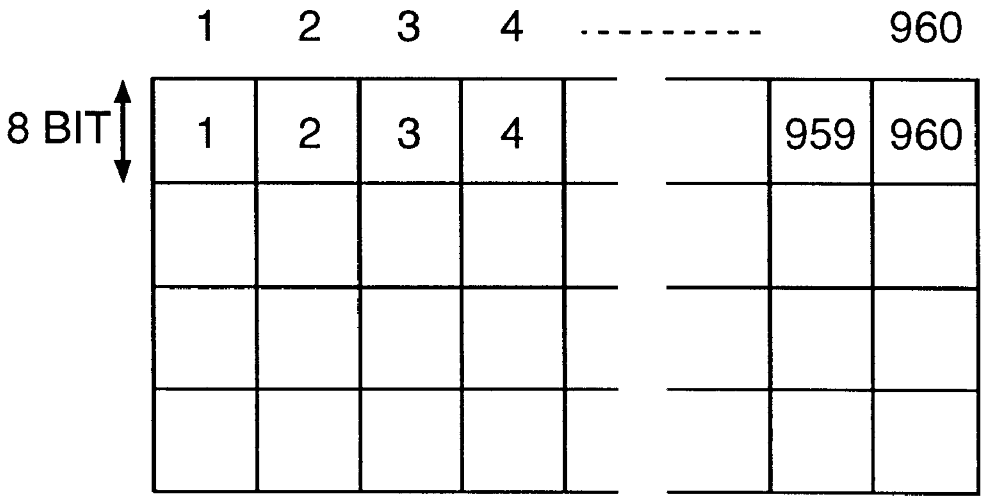
FIGS. 13A and 13B are diagrams showing contents of an input register (DIR) according to the third embodiment.
Figure 13B:
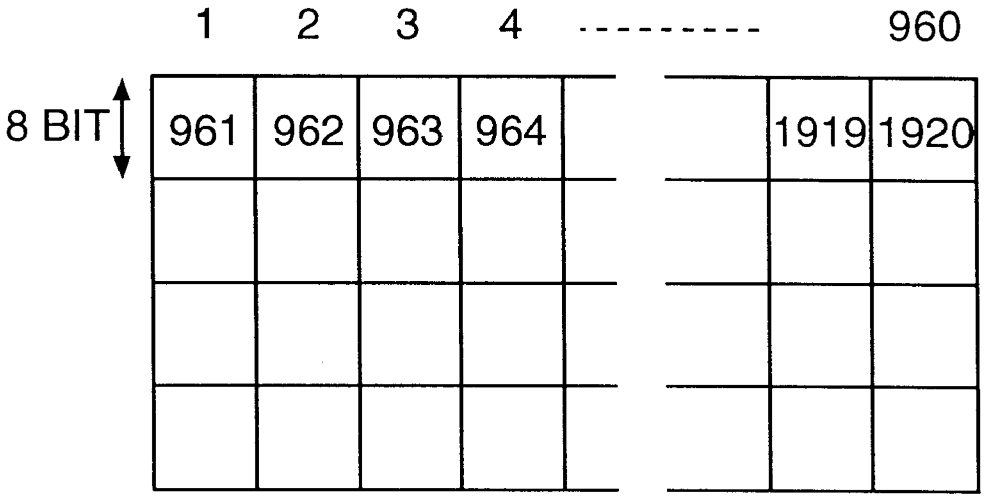

In this manner, the first half of 960 pixels, A1, is inputted to the DIR 2 within a Period 1 as show in FIG. 12 and transferred to the above described RF0 immediately before a Period 2. The ALU performs only the above described shading correction process on the inputted data A1 during the Period 2 and stores the result in the register RF1. Note that in the Period 2, the latter half of input data A2 is inputted to the DIR 2. FIGS. 13A and 13B show the contents of the DIR 2.

Figure 14:
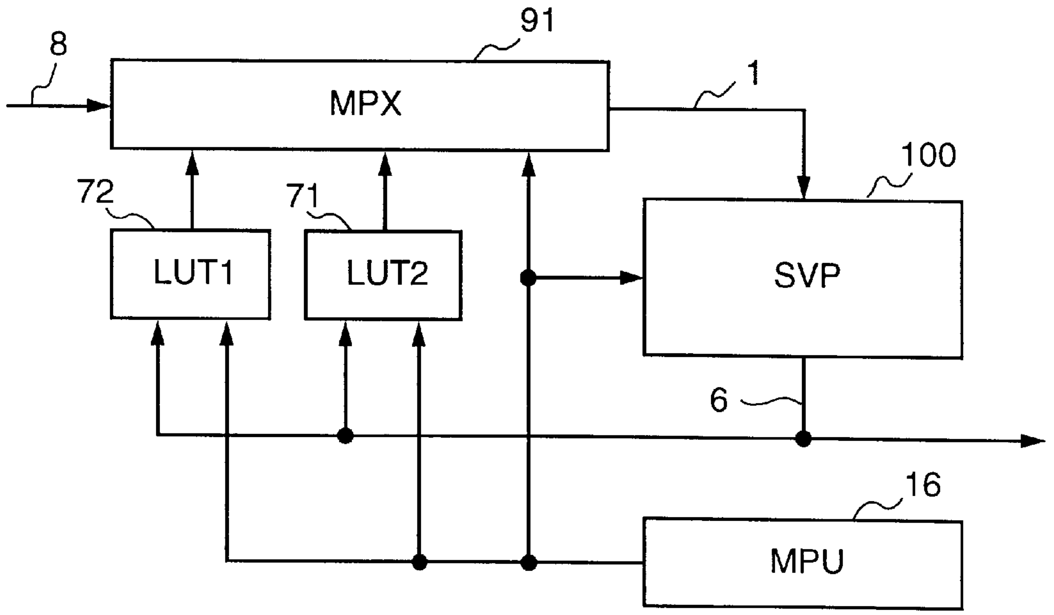
FIG. 14 is a block diagram showing a hardware structure of an image processing circuit according to the third embodiment.

The shading-corrected data S1 is transferred to the DOR 4 immediately before a Period 3 and outputted from the SVP 100 in the Period 3. A logarithmic transformation is performed on the output signal S1 utilizing a RAM 72 having a LUT 1 shown in FIG. 14, and at the same time, the signal S is inputted to the SVP 100 as a signal D1. An MPX 91 in FIG. 14 switches an input addressed to the SVP 100, from the input signal 8 to an output signal of the RAM 72 in the Period 3.

Note that in the Period 3, a shading correction is performed on the latter half of the input signal A2 which has been inputted in the Period 2.

Similarly, an edge emphasizing process is performed on the logarithmic-transformed signal D1 in a Period 4. An edge-emphasized signal E1 is outputted in the next Period 5 and data conversion required for density adjustment is performed at a RAM (LUT 2) 71 in FIG. 14. The density-adjusted signal F1 is inputted to the SVP 100 in the Period 5 with the switching of the MPX 91. Further, the signal F1 is binarized in a Period 6 and outputted at a first period (corresponding to Period 1) of the next raster period of an input signal as a binarized signal O1.

For the latter half of input signal (A2), an edge emphasizing process is performed in the Period 5, binarization process is performed in the first period of the next raster period, and a binarized signal O2 is outputted in the second period of the next raster period.

Figure 15:
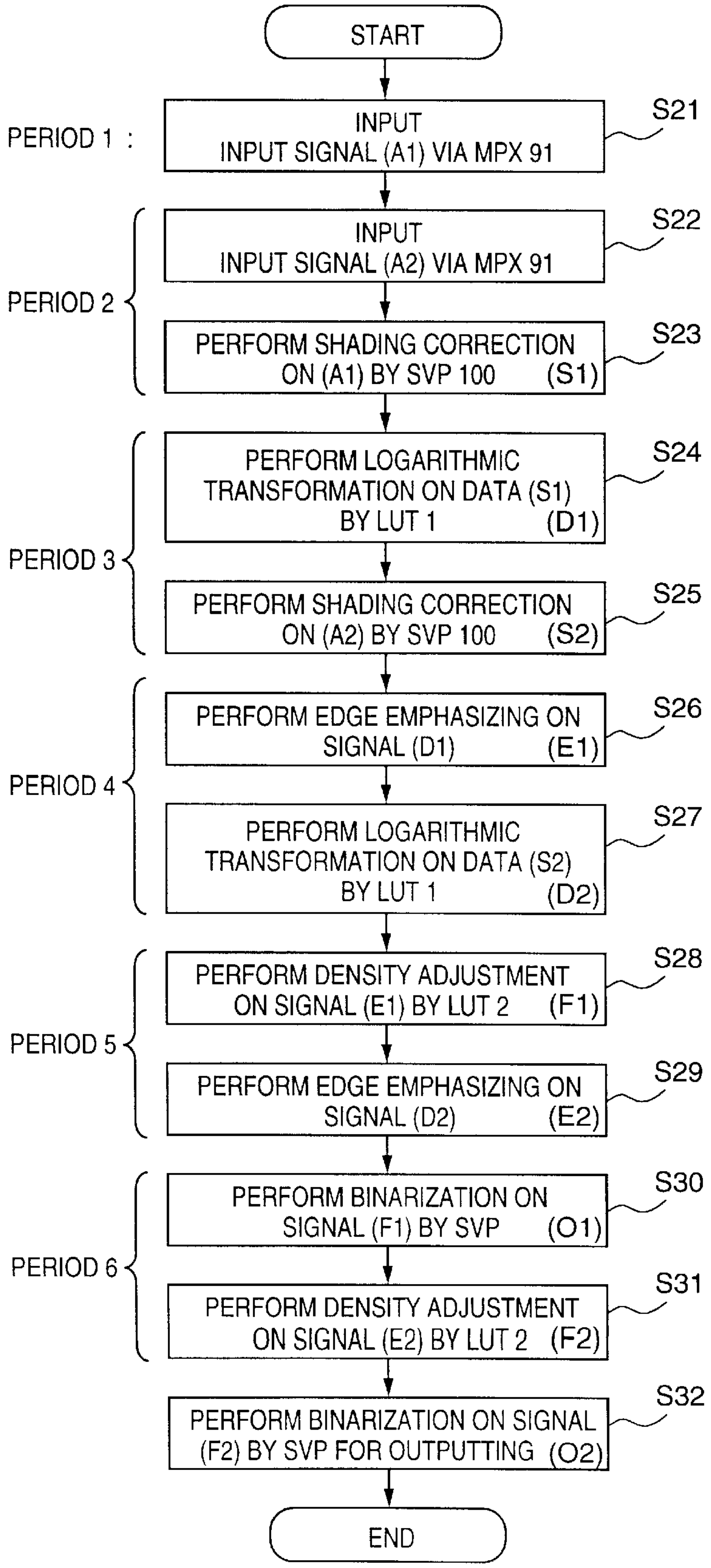
FIG. 15 is a flowchart showing operations executed by the circuit shown in FIG. 14.

FIG. 15 is a flowchart showing the process executed in the third embodiment.

The first half of an input signal A1 is inputted to the SVP 100 in step S21 (Period 1). At this point, if any previous raster data is found in the SVP 100, the latter half of the data is binarized; and if the first half of the binarized signal is found in the SVP 100, it is outputted. In the next step S22, the latter half of the raster signal (A2) is inputted to the SVP 100 via the MPX 91. In step S23, shading correction is performed on the first half of the signal A1 by the SVP 100 and the result (S1) is stored in the register RF1 (Period 2). In step S24, the shading-corrected signal S1 is outputted to the output bus 6, a logarithmic transformation is performed thereon by a LUT 72, and the result (D1) is inputted to the SVP 100 via the MPX 91. In step S25, the SVP 100 performs shading correction on the signal A2 and stores the result (S2) in the register RF1 (Period 3).

In the next step S26, the SVP 100 performs an edge emphasizing process on the signal D1 and stores the result (E1) in the register RF1. In step S27, the signal S2 is outputted to the output bus 6, a logarithmic transformation is performed thereon by the LUT 72 and the result (D2) is inputted to the SVP 100 via the MPX 91 (Period 4). The process proceeds to step S28 where density adjustment is performed on the edge-emphasized signal E1 by a LUT 71 and the result (F1) is inputted to the SVP 100 via the MPX 91. In step S29, the SVP 100 performs an edge emphasizing process on the signal D2 and the result (E2) is stored in the register RF1 (Period 5).

In the next step S30, a binarization process is performed on the signal F1 at the SVP 100 and the result (O1) is set at the register RF1. In step S31, a density adjustment process is performed on the signal E2 outputted to the output bus 6 by the LUT 71 and the result (F2) is inputted to the SVP 100 via the MPX 91 (Period 6). Then in step S32, the binarized data (O1) stored in the register RF1 of the SVP 100 at the first period of the next raster is outputted, the signal F2 is binarized in the same period, and the result (O2) is outputted from the output bus 6 in the next period.

In the third embodiment, since only 8 bits of the input/output registers DIR 2 and DOR 4 is required as described above, a color image, e.g. where each of the input signals R, G and B is 24 bits, can be processed. More than 1920 pixels can also be processed by further dividing the one raster period.

As set forth above, according to the second and third embodiments, an image processing conventionally performed serially by an ASIC or the like can be executed with high speed and low cost, by having plural sets of arithmetic logic units on one chip, performing a LUT conversion on an output signal of the DSP where serially inputted data is stored parallelly and processed in parallel, and inputting the LUT-converted signal to the DSP again for further processing.

Moreover, image data having a large volume can be processed by dividing the period of one raster.

<Fourth Embodiment>

Figure 16:
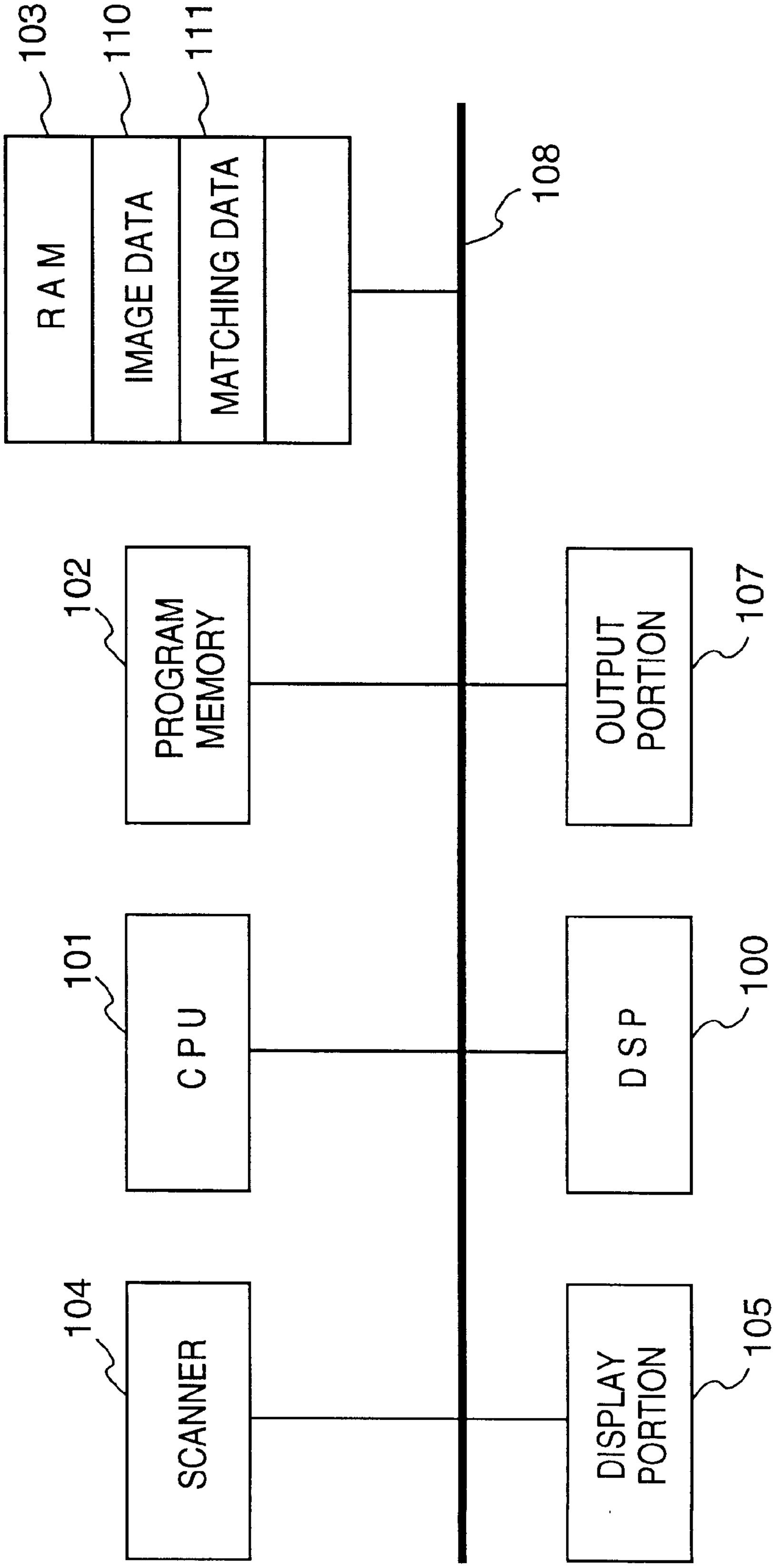
FIG. 16 is a block diagram showing a structure of an image processing apparatus according to a fourth embodiment of the present invention.

FIG. 16 is a block diagram showing a structure of an image processing apparatus according to a fourth embodiment of the present invention. A reference numeral 101 in FIG. 16 denotes a CPU for controlling the entire image processing apparatus, and 102, a program memory for storing control programs executed by the CPU 101 and various data. Note that the control programs stored in the program memory 102 can be a program, for instance, loaded from hard disk or a floppy disk. A reference numeral 103 denotes a RAM for temporarily storing various data at the time of controlling by the CPU 101, and for storing image data 110 inputted from a scanner 104 as well as matching data 111 which is utilized for determining a coincidence of the image data. An original image is photoelectrically read by the scanner 104. Note that the image data 110 stored in the RAM 103 can be image data loaded via a hard disk or a communication line.

A reference numeral 105 denotes a display portion consisting of an LCD or a CRT or the like for displaying inputted image data or messages to an operator. A reference numeral 100 denotes a DSP shown in FIG. 1, and a SVP made by TI (Texas Instrument, Inc.) can be given as an example. A reference numeral 107 denotes an output portion such as an NCU for outputting to a printer, a communication line or the like. A reference numeral 108 denotes a system bus which connects each of the above described portions.

In the following description, explanations are given in a case where the image data 110 stored in the RAM 103 is inputted to the DSP 100 for a process; however, image data can be inputted serially from, e.g. the scanner 104, for a process.

Figure 17A:
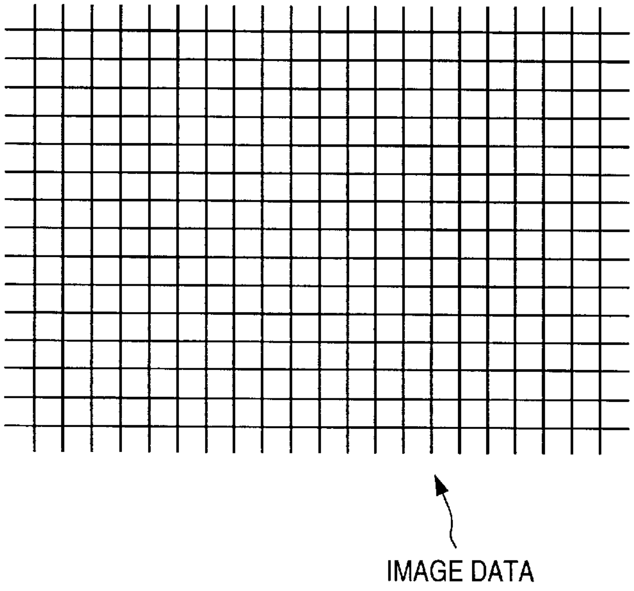
FIGS. 17A and 17B are explanatory views showing image data and matching data according to the fourth embodiment.
Figure 17B:
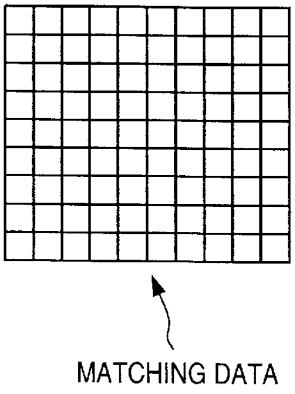

FIGS. 17A and 17B are explanatory views for providing an outline of pattern matching according to the fourth embodiment.

FIG. 17A, for instance, shows image data 110 read by the scanner 104 and stored in the RAM 103, in which a predetermined process is performed and binarized. The matching data 111 in FIG. 17B, for instance, is structured with 10 pixels×10 pixels and provided as a binarized data group of 100 pixels representing a shape to be matched in the image data. A coincidence level between the image data 110 and the matching data 111 can be obtained by comparing each pixel of the matching data 111 with each corresponding pixel of the image data 110 and summing the number of coincident pixels. In other words, a coincidence level SS(x, y) around the pixel of interest (x, y) can be expressed in the following equation:

$$SS(x, y) = \sum_{i=0}^{9}\sum_{j=0}^{9} B(x+i, y+j) ※ M(i, j) \tag{3}$$

Herein, ※ denotes an exclusive OR.

The above process is achieved by sliding a position of a pixel of interest one pixel by one pixel on the image data and executing calculations consecutively.

Figure 18A:
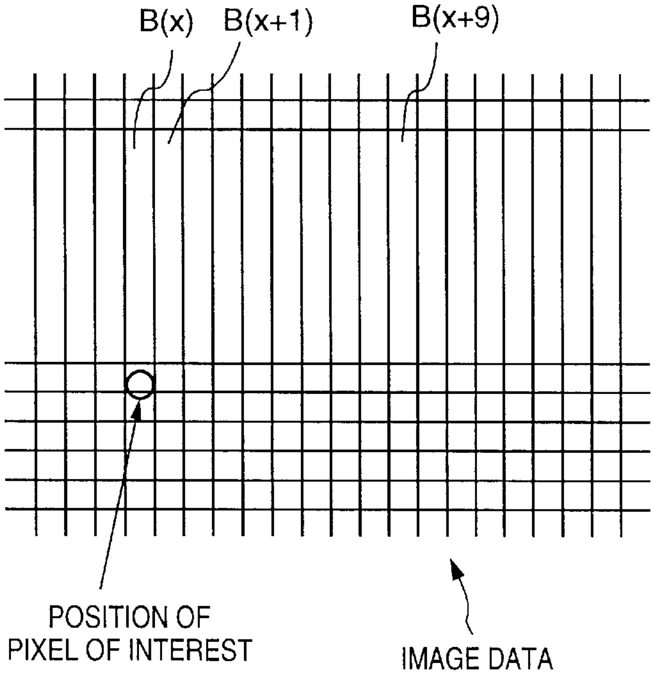
FIGS. 18A and 18B are explanatory views showing the image data and the matching data of FIGS. 17A and 17B divided into columns.

In order to clearly explain the above described process utilizing the parallel-process-type DSP 100, dividing of a calculation process will be described with reference to FIGS. 18A and 18B.

Figure 18B:
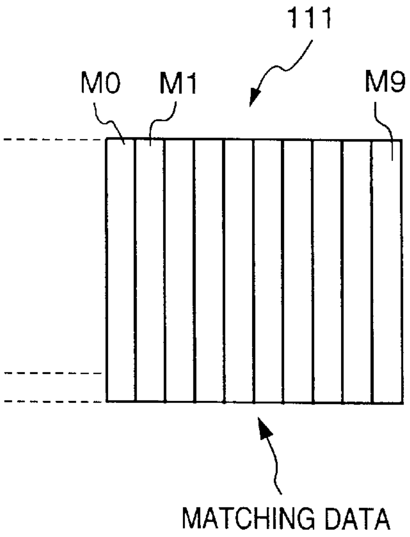

As shown in FIG. 18B, the two-dimensional matching data 111 is divided into columns M0 to M9 for every ten pixels. Image data corresponding to the divided pixel positions is similarly divided in a column for every ten pixels as shown in FIG. 18A, and each column is defined with B(x) to B(x+9). That is:

$$M0 = \{M(0, 0), M(0, 1), \ldots, M(0, 9)\}$$
$$\vdots$$
$$M9 = \{M(9, 0), M(9, 1), \ldots, M(9, 9)\}$$

and, $$B(x)=\{B(x, 0), B(x, 1), \ldots, B(x, 9)\}$$

$$B(x+1)=\{B(x+1, 0), B(x+1, 1), \ldots, B(x+1, 9)\}$$

$$B(x+9)=\{B(x+9, 0), B(x+9, 1), \ldots, B(x+9, 9)\}$$

Therefore, the equation (3) can be expressed as follows:

$$SS(x, y)=B(x) ※M0+B(x+1) ※M1+B(x+2) ※M2+ \ldots +B(x+9) ※M9$$

$$=S(x, 0)+S(x, 1)+S(x, 2)+ \ldots +S(x, 9) \tag{4}$$

Herein, the following conditions are defined:

$$S(x,0)=B(x)※M0$$

$$S(x,1)=B(x+1)※M1$$

$$S(x,2)=B(x+2)※M2$$

$$\vdots$$

$$S(x,9)=B(x+9)※M9$$

With the above described condition, a process utilizing the parallel-process-type DSP 100 will be described below.

As described before, in the DSP 100, each processor element (PE) comprises two register files (RF0, RF1) each having 128 bits. A predetermined process is performed on 8-bit image data inputted by raster scanning and the data is stored as binary data in one of the register files.

Figure 19:
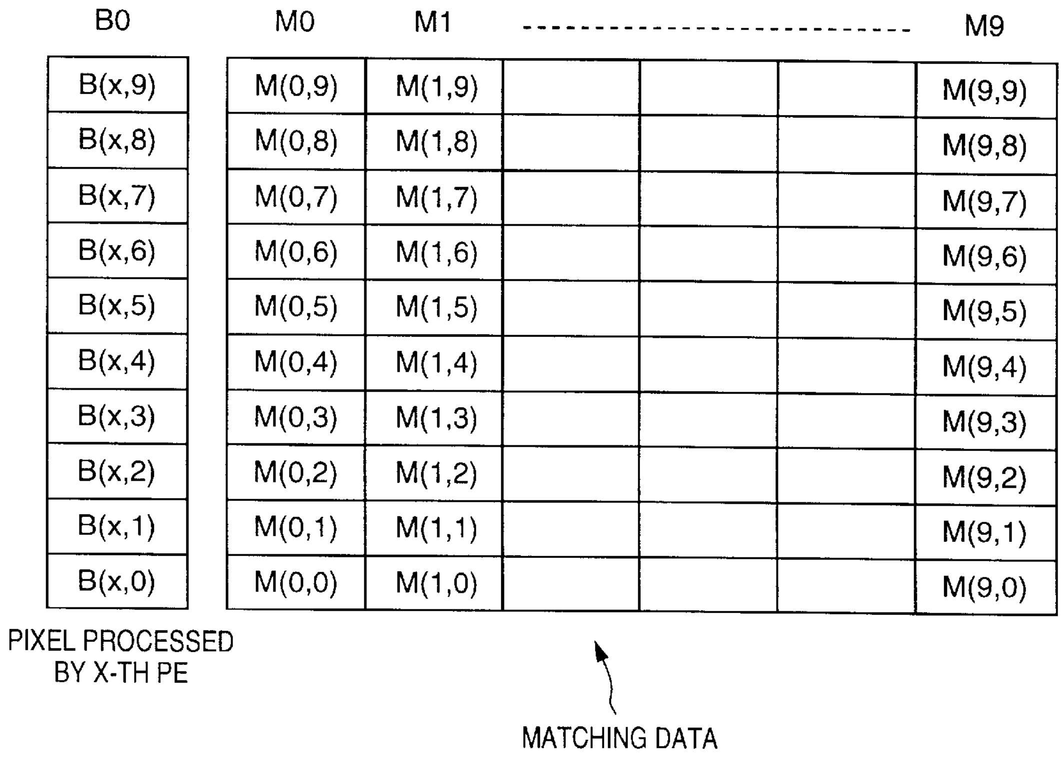
FIG. 19 is a table showing a relationship of a pixel, processed by the x-th processor element (PE) of the DSP and the matching data according to the fourth embodiment.

In other words, binary data B(x) [={B(x, 0), B(x, 1) . . . B(x, 9)} ] shown in FIG. 19 is image data for ten pixels included in a column which is processed by the x-th PE. Herein, B(x, 0) is pixel data included in most-currently-inputted raster data. B(x, 1) is pixel data from a prior raster line, and similarly, B(x, 9) is from nine-raster prior line. The DSP 100 comprises 960 PEs; therefore in the entire DSP 100, image data for 10×960 pixels is maintained at all times. As raster data is consecutively inputted, the oldest raster data is deleted.

Next, the process executed at the x-th PE will be described. Herein, in the DSP 100, these 960 PEs perform simultaneous and parallel processing.

<Calculation of Element Data>

Figure 20:
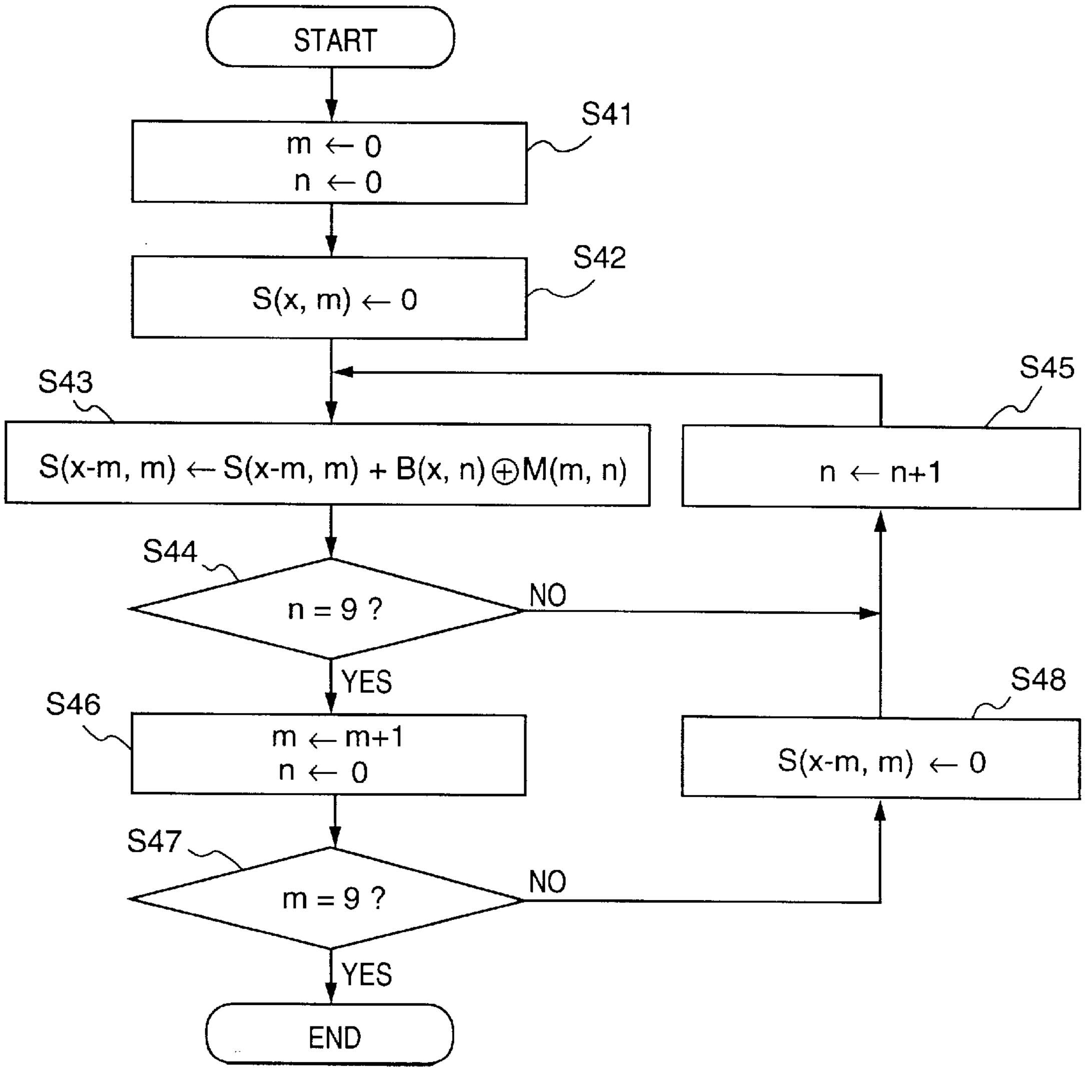
FIG. 20 is a flowchart for obtaining an element which represents a coincidence of image data and matching data according to the fourth embodiment.

FIG. 20 is a flowchart showing a calculation process of the equations (3) and (4). A control program for executing the process is stored in the program memory (PM) 5 in FIG. 1.

In FIG. 20, variables m and n are first reset to 0 (zero) in step S41 and element data S(x, m), that is S(x, 0), is reset to 0 (zero) in step S42. Then in step S43, an exclusive OR between image data B(x, 0) and matching data M(0, 0) is calculated and the result is stored in S(x, 0). If coincident, the element value S(x, 0) becomes 0 (zero).

In the above described manner, from steps S43 to S45, an exclusive OR between each of the image data B(x, 1) to B(x, 9) and each of the matching data M(0, 1) to M(0, 9) is calculated and the result is consecutively added to the element S(x, 0). As a result, element data having the maximum value of 10 and the minimum value of 0 (zero) is obtained as the element S(x, 0).

In the next step S44, if n=9 is satisfied, the process proceeds to step S46 where m+1 is executed; then in step S48, element S(x−1, 1) is cleared to 0 (zero). Element S(x−1, 1) is then obtained by repeating steps S43 to S45 described above. Hereinafter, elements S(x−2, 2) to S(x−9, 9) are obtained in the same manner. When it is determined that the calculation of element S(x−9, 9) is completed in step S47, the calculation process ends.

Elements S(x, 0) and S(x−1, 1) to S(x−9, 9) corresponding to the image data B(x) processed by the x-th PE can be obtained in the above described manner.

Note that element S(x+1, 0) and S(x, 1) to S(x−8, 9) corresponding to image data B(x+1) is obtained by the (x+1)th PE adjoining to the x-th PE. Similarly, elements for image data corresponding to other PEs are obtained in parallel.

FIG. 21 shows element data S obtained by each of the PEs and each element data is simultaneously stored in the address 0 to address 9 of the register file (RF0 or RF1 each of which having 128 bit).

<Adding to Coincidence Level Data>

Next, descriptions are given on the steps of obtaining coincidence level data at a position of a pixel of interest by summing the element data obtained in the foregoing calculations.

Figure 22:
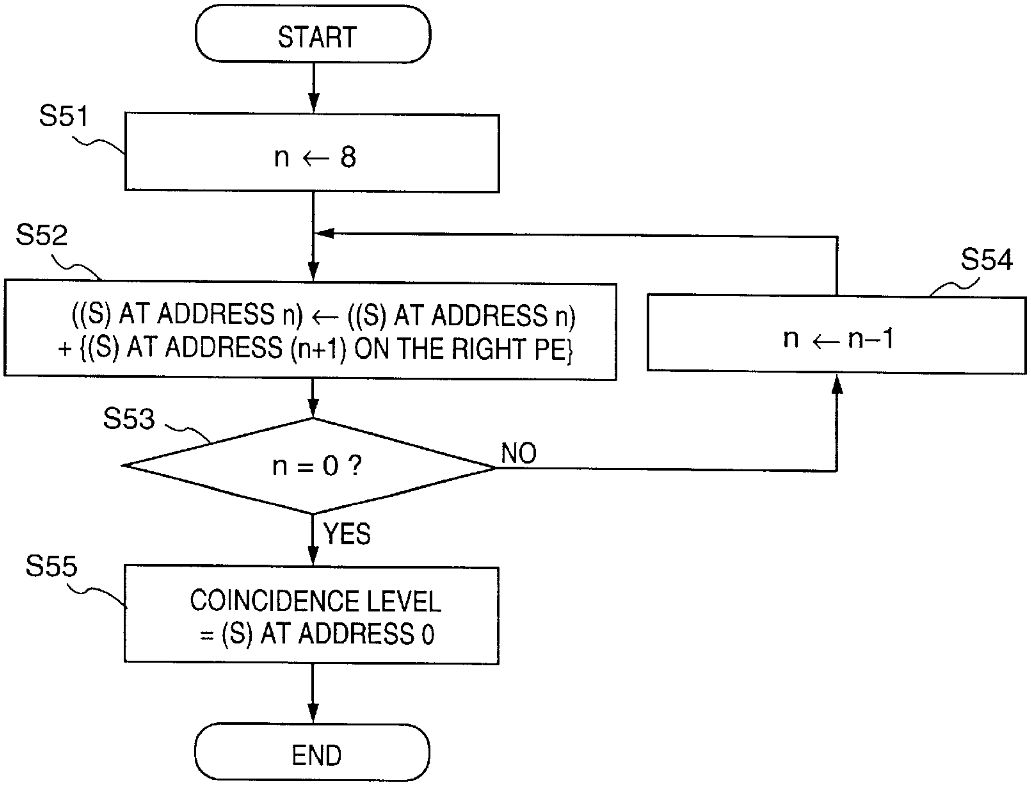
FIG. 22 is a flowchart showing a process for calculating coincident data executed by the DSP according to the fourth embodiment.

FIG. 22 is a flowchart illustrating a calculation process in the PE of the DSP 100 according to the fourth embodiment, and a control program for executing the process is stored in the PM 5.

In FIG. 22, a variable n is set to 8 in step S51, and in step S52 element data S at the address (n+1), processed by an adjoining processor on the right, is added to element data S at the address n. In the DSP 100, the n-th PE can access registers allocated for PEs addressed at (n+1), (n+2), (n−1) and (n−2). Accordingly, all the PEs are capable of executing a 5×5 two-dimensional filter calculation. In other words, element data S at address 9, processed by the adjoining PE on the right, is added to the element data S at address 8.

Referring to FIG. 21, the x-th PE executes the calculation: S(x−8, 8)←S(x−8, 8)+S(x−8, 9) in step S52. Similarly at the (x+1)th PE, the calculation: S(x−7, 8)←S(x−7, 8)+S(x−7, 9) is executed. Other PEs execute the same operation. Then, n−1 is executed for the variable n in step S54 and the x-th PE executes the calculation: S(x−7, 7)←S(x−7, 7)+S(x−7, 8) in the next step S52. Since S(x−7, 9) has been already added to S(x−7, 8) in the previous step S52, the above calculation is equivalent to the following calculation:

$$S(x-7,7)\leftarrow S(x-7,7)+S(x-7,8)+S(x-7,9)$$

If the above calculation is repeated nine times until n=0 is satisfied in step S53, the result is equivalent to execution of the following calculation by the x-th PE: S(x, 0)=S(x, 0)+S(x, 1)+S(x, 2)+S(x, 3)+S(x, 4)+S(x, 5)+S(x, 6)+S(x, 7)+S(x, 8)+S(x, 9).

As apparent from a comparison between the above equation and the equation (4), coincidence level data SS(x, y) can be obtained by the above calculation.

Similarly, the (x+1)th PE adjoining to the x-th PE executes the calculation: S(x+1, 0)=S(x+1, 0)+S(x+1, 1)+S(x+1, 2)+S(x+1, 3)+S(x+1, 4)+S(x+1, 5)+S(x+1, 6)+S(x+1, 7)+S(x+1, 8)+S(x+1, 9) and stores the result at the address 0 (zero). This is equivalent to obtaining S(x+1, 0), where a position of a pixel of interest is shifted for one pixel from the x-th PE.

Accordingly, by executing these processes in parallel by ten PEs, coincidence level data representative of a coincidence level between image data for 10 pixels×10 pixels and matching data for 10 pixels×10 pixels, at a position where the matching data is shifted for one pixel (one row) from the inputted image data, can be stored in the address 0 (zero) of a register managed by each PE.

In step S55, contents at the address 0 (zero) of a register of each processor element (PE) is examined. If it is 0 (zero), it denotes that the matching data and the corresponding image data for 10 pixels×10 pixels are coincident, and if it is not 0 (zero), it denotes that there are non-coincident pixels and the numbers of the non-coincident pixels are determined.

The characteristic of the fourth embodiment is that all the divided pattern data (coefficient data) for image data processed by each PE is calculated, as described above. In other words, although necessary data for each PE is only one data among the calculation results, calculation results required by other adjoining PEs are obtained, thereby enabling parallel processing.

Further, it is possible to execute a two-dimensional multiplication and summing calculation in a wide area by consecutively summing the calculation results obtained at the adjoining PE.

Note that according to the calculation examples in the fourth embodiment, the number of times for calculating an exclusive OR for one bit is 100 times, and the number of times for summing calculation for one bit is 150 times; accordingly it is possible to execute calculations in 250 instruction cycles as a whole.

Figure 23:
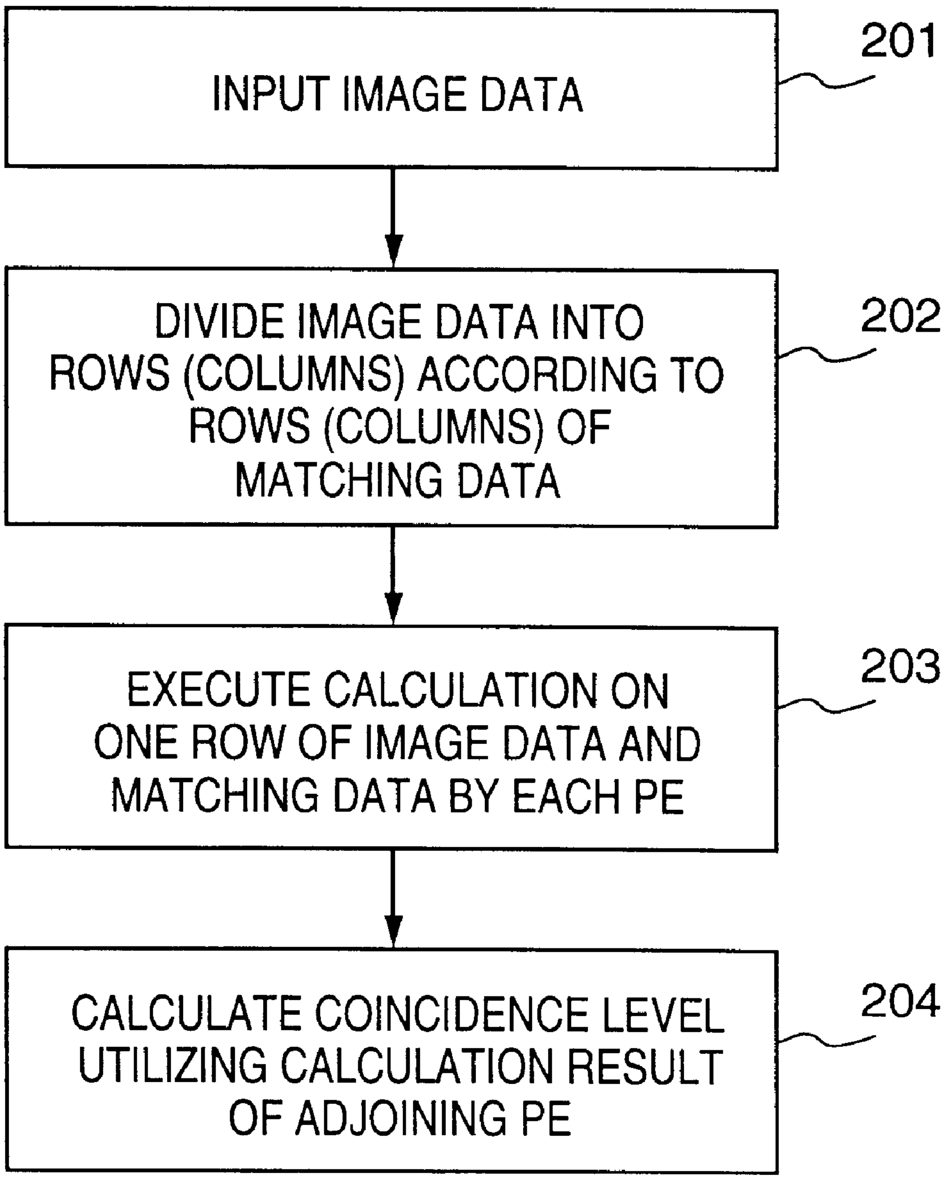
FIG. 23 is a flow chart functionally showing a process of the image processing apparatus according to the fourth embodiment.

FIG. 23 is a functional view of the above described process.

Image data is inputted in step 201 and stored in the RAM 103 as the image data 110. In step 202, the image data 110 is divided in columns or rows so that the number of bits (pixels) in a column or a row of the matching data 111, which is a calculation subject of the image data 110, coincides with the number of pixels in a column of the image data 110. In step 203, one row (column) of image data and one row (column) of matching data is calculated in each pixel unit utilizing each PE of the DSP 100. The calculation result is stored as the above-described element SS(x, y). At step 204, a coincidence level of the image data and the matching data is calculated utilizing the result calculated by the adjoining PE.

<Other embodiment>

Pattern matching among bit data, that is, calculation of a correlation among bit data has been described in the foregoing embodiment. The equation (3):

$$SS(x, y) = \sum_{i=0}^{9}\sum_{j=0}^{9} B(x+i, y+j) ※ M(i, j)$$

can be applied to a two-dimensional multiplication and summing calculation, if B(x+i, y+j) is a density signal having 8 bits, M(i, j), a weight coefficient for a general space filter, and if a multiplication (×) is executed instead of the exclusive OR (※). In other words, the equation (3) is applicable to a smoothing calculation, an edge emphasizing calculation or the like without any limitations.

For the purpose of explanation, a calculation area is set to 10 pixels×10 pixels in the above description; however, the calculation area is not limited to this area as long as the DSP is able to apply a calculation result from at least one of the adjoining PEs.

The present invention can be applied to a system constituted by a plurality of devices such as a host computer, an interface, a printer and the like, or to an apparatus comprising a single device such as a copy machine. Furthermore, the invention is applicable also to a case where the object of the invention is attained by supplying a program to a system or an apparatus. In this case, a memory medium storing a program according to the present invention composes the present invention. By reading the program from the memory medium to a system or an apparatus, the system or apparatus performs predetermined operations.

As has been described above, according to the fourth embodiment, when a two-dimensional multiplication and summing calculation is performed between image data and a two-dimensional operation coefficient such as pattern data, the image data as well as the two-dimensional operation coefficient are divided in rows, and each of a plurality of parallelly-positioned ALUs executes calculations with all the two-dimensional operation coefficients for the image data divided in rows, where each ALU utilizes a calculation result of the adjoining ALU. By virtue of this feature, calculations in a wide area of image data can be executed with high speed and low cost.

Further, by having a plurality of calculation units and activating them in parallel, a quick calculation of two-dimensional image data and two-dimensional operation coefficient is possible.

Furthermore, by performing a calculation utilizing a calculation result obtained by other calculation units, image processing is realized with less calculation time.

Note that each of the embodiments has been independently described in the above descriptions, however the present invention is not limited to the above description and can be attained by appropriately combining the structures of each embodiment.

The present invention is not limited to the above embodiments and various changes and modifications can be made within the spirit and scope of the present invention. Therefore, to appraise the public of the scope of the present invention, the following claims are made.

What is claimed is:

1. An image processing apparatus for inputting an image signal, performing image processing and outputting the processed image signal, comprising:

pixel registers for storing a plurality of pixel signals included in the image signal and outputting pixel signals in parallel;

power calculating means for calculating, in parallel, respective power values of the pixel signals output from said pixel registers;

memory for storing, in parallel, the respective power values of the pixel signals calculated by said power calculating means;

multiplying means for multiplying, in parallel, each of the power values stored in said memory by a corresponding constant;

summing means for summing each of values resulting by said multiplying means;

output means for holding summed values summed by said summing mean for each of the plurality of pixel signals and outputting the summed values in an order of raster scanning; and control means for controlling the calculations performed by said power calculating means, said multiplying mean, said summing means and said output means in accordance with a control program for implementing an equation where a function utilized in said image processing is approximated by a polynomial, wherein said power calculating means, said multiplying means and said summing means, each includes a plurality of arithmetic logical units, the number of the arithmetic logical units corresponds to the number of plurality of pixel signals stored in said pixel registers.

2. The image processing apparatus according to claim 1, wherein said power calculating means and said multiplying means are executed in parallel.

3. The image processing apparatus according to claim 1, wherein said image processing is a logarithmic transformation process.

4. The image processing apparatus according to claim 1, wherein said image processing is a shading correction process.

5. The image processing apparatus according to claim 1, wherein said image processing is an edge emphasizing process.

6. The image processing apparatus according to claim 1, wherein said image processing is a density adjustment process.

7. The image processing apparatus according to claim 1, wherein said image processing is a binarization process.

8. An image processing method for inputting an image signal, performing image processing and outputting the processed image signal, comprising the steps of:

supplying a plurality of pixel signal, in parallel, included in the image signal;

calculating, in parallel, respective power values of the pixel signal, based on an equation where a function utilized in said image processing is approximated by a polynomial;

holding, in parallel, the respective power values calculated in said calculating step;

multiplying, in parallel, each of the power values held in said holding step by a corresponding constant based on said equation;

summing each of values resulting in said multiplying step in accordance with the equation; and holding a same number of values summed by said summing step as a number of the plurality of pixel signals and outputting the values in an order of raster scanning.

9. The image processing method according to claim 8, wherein said power calculating step and said multiplying step are executed in parallel.

10. The image processing method according to claim 8, wherein said image processing is a logarithmic transformation process.

11. The image processing method according to claim 8, wherein said image processing is a shading correction process.

12. The image processing method according to claim 8, wherein said image processing is an edge emphasizing process.

13. The image processing method according to claim 8, wherein said image processing is a density adjustment process.

14. The image processing method according to claim 8, wherein said image processing is a binarization process.

15. The image processing method according to claim 8, wherein said power calculating step, said multiplying step and said summing step are executed by arithmetic logic units included in one chip of a digital signal processor.

16. An image processing apparatus, comprising:

inputting means for inputting an image signal in an order of raster scanning;

first memory for storing a plurality of pixel signals included in the image signal and outputting the pixel signals in parallel;

calculating means having plural sets of arithmetic logic units which execute calculations, in parallel, on each of the plurality of pixel signals outputted from the first memory;

second memory for storing, in parallel, calculated pixel signals outputted by said calculating means and outputting the calculated pixel signals in the order of raster scanning;

converting means for converting the calculated pixel signals outputted from said second memory, by utilizing look-up table in accordance with the order of raster scanning; and control means for selectively switching either the image signal converted by said converting means or the image signal inputted by said inputting means, and for supplying the selected image signal to said first memory or said calculating means, wherein said calculating means has the same number of arithmetic logic units as a number of the plurality of pixel signals outputted in parallel from said first memory and outputs a same number of calculated pixel signals as the number of the plurality of pixel signals in parallel.

17. The image processing apparatus according to claim 16, wherein said calculating means comprises maintaining means for maintaining plural lines of an image signal, and an edge emphasizing process is performed based on the plural lines of image signal maintained by said maintaining means.

18. The image processing apparatus according to claim 16, wherein said calculating means stores a threshold value, and a binarization process for binarizing is performed by comparing an inputted image signal with said threshold value.

19. The image processing apparatus according to claim 16, wherein said converting means performs logarithmic transformation utilizing said look-up table.

20. The image processing apparatus according to claim 16, wherein said converting means performs density adjustment of an image signal utilizing said look-up table.

21. The image processing apparatus according to claim 16, wherein said calculating means includes plural processors embodied in one chip of a digital signal processor.

22. An image processing apparatus, comprising:

input means for inputting an image signal having more than N pixels in one raster in an order of rater scanning;

dividing means for dividing the image signal for one raster inputted by said input means into a plurality of blocks, each block having consecutive N pixel signals of the image signal;

calculating means having N sets of arithmetic logic units, for inputting the consecutive N pixel signals and performing calculations in parallel on the plurality of blocks;

converting means for supplying each pixel signal of the consecutive N pixel signals in each of the plurality of blocks divided by said dividing means to each arithmetic logic unit in said calculating means, and converting calculated results outputted from the N sets of arithmetic logic units by utilizing a look-up table; and control means for selectively switching either image signals converted by said converting means or image signals including consecutive N pixel signals corresponding to a next block to a block being processed by said dividing means and supplying selected image signals to said calculating means, wherein said calculating means outputs in parallel the calculated N pixel signals from the N sets of arithmetic logic units to said converting means.

23. The image processing apparatus according to claim 22, wherein said calculating means comprises maintaining means for maintaining plural lines of an image signal, and wherein an edge emphasizing process is performed based on the plural lines of the image signal maintained by said maintaining means.

24. The image processing apparatus according to claim 22, wherein said calculating means stores a threshold value, and wherein a binarization process for binarizing is performed by comparing an inputted image signal with said threshold value.

25. The image processing apparatus according to claim 22, wherein said converting means performs logarithmic transformation utilizing said look-up table.

26. The image processing apparatus according to claim 22, wherein said converting means performs density adjustment of an image signal utilizing said look-up table.

27. The image processing apparatus according to claim 22, wherein said calculating means includes plural processors embodied in one chip of a digital signal processor.

28. An image processing method, comprising the steps of:
inputting an image signal in an order of raster scanning;
storing pixel signals included in the image signal in a first memory and outputting the pixel signals in parallel from the first memory;
calculating, in parallel, using a same number of arithmetic units as a number of the pixel signals outputted from the first memory, and outputting in parallel a same number of calculated results as the number of the pixel signals;
inputting the calculated results of the pixel signals by said calculating step in parallel into a second memory and outputting form the second memory in the order of the raster scanning;
converting the calculated results of the pixel signals outputted in the order of raster scanning from the second memory, by utilizing a look-up table; and
selectively switching the pixel signals converted in said converting step or the pixel signals included in the input image signal and supplying to either the first memory or said calculating step.

29. The image processing method according to claim 28, wherein in said calculating step, plural lines of an image signal are maintained and wherein an edge emphasizing process is performed based on the maintained plural lines of image signal.

30. The image processing method according to claim 28, wherein in said calculating step, a threshold value is stored and wherein a binarization process for binarizing is performed by comparing an inputted image signal with said threshold value.

31. The image processing method according to claim 28, wherein in said converting step, logarithmic transformation is performed utilizing said look-up table.

32. The image processing method according to claim 28, wherein in said converting step, density adjustment is performed on an image signal utilizing said look-up table.

33. The image processing method according to claim 28, wherein in said calculating step, calculations are executed by plural processors embodied in one chip of a digital signal processor.

34. An image processing method comprising the steps of:
inputting an image signal in an order of raster scanning, one raster having more than N pixel signals;
dividing the image signal for one raster inputted in said inputting step into a plurality of blocks each block having consecutive N pixel signals;
supplying each of the consecutive N pixel signals in each of the plurality of blocks divided in said dividing step, to each of N sets of arithmetic logic units and calculating, in parallel, each of the consecutive N pixel signals;
converting N sets of calculated results outputted, in parallel, from the N sets of arithmetic logic units by utilizing a look-up table; and
selectively switching signals, either the image signal converted in said converting step or the image signal divided in said dividing step, and supplying to the N sets of arithmetic logic units.

35. The image processing method according to claim 34, wherein in said calculating step, plural lines of an image signal are maintained and wherein an edge emphasizing process is performed based on the maintained plural lines of image signal.

36. The image processing method according to claim 34, wherein in said calculating step, a threshold value is stored and wherein a binarization process for binarizing is performed by comparing an inputted image signal with said threshold value.

37. The image processing method according to claim 34, wherein in said converting step, logarithmic transformation is performed utilizing said look-up table.

38. The image processing method according to claim 34, wherein in said converting step, density adjustment is performed on an image signal utilizing said look-up table.

39. The image processing method according to claim 34, wherein in said calculating step, calculations are executed by plural processors embodied in one chip of a digital signal processor.

40. An image processing apparatus for performing an image process utilizing a parallel-process-type DSP (digital signal processor) which ash plural sets of arithmetic logic units controlled by a control program, comprising:
calculating means for calculating, in parallel, a predetermined amount of image data and a predetermined amount of subject calculation data in a unit of pixel by utilizing each of the plural sets of arithmetic logic units;
storing means for storing, in parallel, calculated results calculated by said calculating means; and
totalizing means for totalizing, in parallel, said calculated results by utilizing at least a calculated result calculated by another arithmetic calculation unit and stored by said storing means,
wherein said totalizing means outputs in parallel the same number of summed results as the number of the plural sets of arithmetic logic units.

41. The image processing apparatus according to claim 40, wherein said predetermined amount of image data is one row of image data which corresponds to the number of data included in one row of said subject calculation data.

42. The image processing apparatus according to claim 40, wherein said predetermined amount of image data is one column of image data which corresponds to the number of data included in one column of said subject calculation data.

43. The image processing apparatus according to claim 40, wherein said subject calculation data is matching data for determining coincidence with said image data.

44. The image processing apparatus according to claim 40, wherein said subject calculation data is matrix data for performing a smoothing process on said image data.

45. An image processing method for performing an image process utilizing a parallel-process-type DSP (digital signal processor) which has plural sets of arithmetic units controlled by a control program, comprising the steps of:
dividing each of image data and predetermined two-dimensional data into rows so that each row has a same number of data;
allocating one set of arithmetic calculation units to one row of image data divided in said dividing step; and
performing calculations, in parallel, between the image data divided into rows, each of which is processed by each of the arithmetic units, and all rows of the two-dimensional data, in unit of a row;
wherein in the calculations, a same number of the arithmetic units as the number of rows divided in said dividing step calculate the image data divided into rows and output calculated results in parallel.

46. The image processing apparatus according to claim 45, wherein said two-dimensional data is matching data for determining coincidence with said image data.

47. The image processing apparatus according to claim 45, wherein said two-dimensional data is matrix data for performing a smoothing process on said image data.

48. An image processing method for performing an image process utilizing a parallel-process-type DSP (digital signal processor) which has plural sets of arithmetic units controlled by a control program, comprising the steps of:

dividing image data and predetermined two-dimensional data into columns so that each column has a same number of data;

allocating one set of the arithmetic units to one column of said divided image data; and performing calculations between the image data divided into columns, each of which is processed by each of the arithmetic units, and all columns of the two-dimensional data, in unit of column in parallel;

wherein in the calculations, a same number of the arithmetic units as the number of columns divided in said dividing step calculate the image data divided into columns and output calculated results, in parallel.

49. The image processing apparatus according to claim 48, wherein said two-dimensional data is matching data for determining coincidence with said image data.

50. The image processing apparatus according to claim 48, wherein said two-dimensional data is matrix data for performing a smoothing process on said image data.

* * * * *

UNITED STATES PATENT AND TRADEMARK OFFICE

CERTIFICATE OF CORRECTION

PATENT NO. : 6,067,088

DATED : May 23, 2000

INVENTOR(S) : HIROSHI TANIOKA ET AL.

It is certified that error appears in the above-identified patent and that said Letters Patent is hereby corrected as shown below:

COLUMN 2:

Line 23, "sets" should read --set--.

COLUMN 4:

Line 67, "area" should read --areas--.

COLUMN 5:

Line 1, "area" should read --areas--; and
Line 48, "[Second Embodiment]" should read --<Second Embodiment>--.

COLUMN 6:

Line 24, "byte" should read --bytes--.

COLUMN 7:

Line 33, "followings:" should read --following:--.

COLUMN 8:

Line 23, "show" should read --shown--.

COLUMN 9:

Line 31, "is" should read --are--;
Line 38, "ΛSIC" should read --ASIC--; and
Line 67, "Λ" should read --A--.

UNITED STATES PATENT AND TRADEMARK OFFICE

CERTIFICATE OF CORRECTION

PATENT NO. :6,067,088

DATED : May 23, 2000

INVENTOR(S) :

HIROSHI TANIOKA ET AL.

It is certified that error appears in the above-identified patent and that said Letters Patent is hereby corrected as shown below:

COLUMN 10:

Line 50, "⋮" should read --⁞--.

COLUMN 11:

Line 7,"⋮" should read --⁞--;
Line 45, "Λs" should read --As--; and
Line 67, "bit)." should read --bits).--.

COLUMN 12:

Line 25, "been already" should read --already been--.

COLUMN 17:

Line 15, "form" should read --from--.

COLUMN 18:

Line 59, "row;" should read --row,--.

UNITED STATES PATENT AND TRADEMARK OFFICE
CERTIFICATE OF CORRECTION

PATENT NO. : 6,067,088
DATED : May 23, 2000
INVENTOR(S) : HIROSHI TANIOKA ET AL.

It is certified that error appears in the above-identified patent and that said Letters Patent is hereby corrected as shown below:

COLUMN 20:

Line 2,"parallel;" shoud read --parallel,--.

Signed and Sealed this

Twenty-fourth Day of April, 2001

Attest:

Nicholas P. Godici

NICHOLAS P. GODICI

*Attesting Officer* *Acting Director of the United States Patent and Trademark Office*